(12) United States Patent
Davydov et al.

(10) Patent No.: US 9,155,082 B2
(45) Date of Patent: Oct. 6, 2015

(54) INTERFERENCE MITIGATION IN THE CONTEXT OF HETEROGENEOUS NETWORKS WITH COORDINATED TRANSMISSION POINTS WITH A COMMON TRANSMISSION POINT IDENTITY

(71) Applicants: Alexei Davydov, Nizhny Novgorod (RU); Gregory Morozov, Nizhny Novgorod (RU); Alexander Maltsev, Nizhny Novgorod (RU); Vadim Sergeyev, Nizhny Novgorod (RU); Ilya Bolotin, Nizhny Novgorod (RU)

(72) Inventors: Alexei Davydov, Nizhny Novgorod (RU); Gregory Morozov, Nizhny Novgorod (RU); Alexander Maltsev, Nizhny Novgorod (RU); Vadim Sergeyev, Nizhny Novgorod (RU); Ilya Bolotin, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 465 days.

(21) Appl. No.: 13/628,923

(22) Filed: Sep. 27, 2012

(65) Prior Publication Data

US 2013/0244709 A1 Sep. 19, 2013

Related U.S. Application Data

(60) Provisional application No. 61/612,188, filed on Mar. 16, 2012.

(51) Int. Cl.
*H04B 15/00* (2006.01)
*H04W 72/04* (2009.01)
(Continued)

(52) U.S. Cl.
CPC ......... *H04W 72/0413* (2013.01); *H04L 1/1896* (2013.01); *H04L 5/0055* (2013.01);
(Continued)

(58) Field of Classification Search
CPC . H04W 72/082; H04W 52/243; H04W 24/00; H04W 24/02; H04W 52/02; H04W 52/0235; H04W 52/143; H04W 72/04; H04W 72/0446; H04L 5/0055; H04L 5/006; H04L 5/1438; Y02B 60/50

USPC ........ 455/501, 509, 513, 452.1, 452.2, 67.13, 455/63.1; 370/252, 329
See application file for complete search history.

(56) References Cited

U.S. PATENT DOCUMENTS

2010/0267408 A1* 10/2010 Lee et al. ............ 455/509
2012/0052895 A1* 3/2012 Clerckx et al. ......... 455/509
(Continued)

FOREIGN PATENT DOCUMENTS

KR 1020100115653 A 10/2010
KR 1020110033974 A 4/2011
(Continued)

OTHER PUBLICATIONS

International Search Report and Written Opinion received for PCT Patent Application No. PCT/US2013/032671, mailed on Jun. 28, 2013, 18 pages.
(Continued)

*Primary Examiner* — Sujatha Sharma
(74) *Attorney, Agent, or Firm* — Thorpe North & Western LLP

(57) ABSTRACT

Technology is discussed for extending frequency and time based approaches, such as Inter-Cell Interference Coordination (ICIC) and enhanced ICIC (eICIC), to interference mitigation for clusters within a Wireless Wide Area Network (WWAN) of transmission points with a common transmission point identity. Multiple transmission power messages correlated to different transmission point characteristics can be configured among multiple transmission points sharing the same transmission point identity. These multiple transmission power messages can be used to coordinate transmissions from adjacent transmission points on differing frequencies. Additionally, new sets of reference signals can be configured to correlate to different transmission point characteristics. These new, correlated reference signals can be used to decouple measurements used to provide feedback to one set of transmission points from reference signals transmitted by another set of transmission points with the same transmission point identity.

14 Claims, 13 Drawing Sheets

(51) Int. Cl.

| | | |
|---|---|---|
| *H04W 72/08* | (2009.01) | |
| *H04W 52/02* | (2009.01) | |
| *H04L 5/14* | (2006.01) | |
| *H04W 72/12* | (2009.01) | |
| *H04W 76/04* | (2009.01) | |
| *H04W 24/00* | (2009.01) | |
| *H04W 24/02* | (2009.01) | |
| *H04N 21/258* | (2011.01) | |
| *H04N 21/414* | (2011.01) | |
| *H04N 21/6405* | (2011.01) | |
| *H04N 21/6408* | (2011.01) | |
| *H04W 4/06* | (2009.01) | |
| *H04L 5/00* | (2006.01) | |
| *H04L 12/18* | (2006.01) | |
| *H04L 29/06* | (2006.01) | |
| *H04W 28/02* | (2009.01) | |
| *H04L 1/18* | (2006.01) | |
| *H04W 52/14* | (2009.01) | |

(52) U.S. Cl.
CPC .............. *H04L 5/14* (2013.01); *H04L 5/1438* (2013.01); *H04L 12/189* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 72/04* (2013.01); *H04W 72/042* (2013.01); *H04W 72/0406* (2013.01); *H04W 72/048* (2013.01); *H04W 72/082* (2013.01); *H04W 72/1205* (2013.01); *H04W 76/048* (2013.01); *H04W 52/0229* (2013.01); *H04W 52/143* (2013.01); *H04W 72/0446* (2013.01); *Y02B 60/50* (2013.01)

(56) References Cited

U.S. PATENT DOCUMENTS

| | | | |
|---|---|---|---|
| 2013/0250882 A1* | 9/2013 | Dinan | 370/329 |
| 2014/0073338 A1* | 3/2014 | Lioulis et al. | 455/452.1 |
| 2014/0073342 A1* | 3/2014 | Lioulis et al. | 455/452.2 |
| 2014/0073368 A1* | 3/2014 | Teyeb et al. | 455/501 |
| 2014/0128117 A1* | 5/2014 | Kwun et al. | 455/513 |
| 2014/0254531 A1* | 9/2014 | Lee et al. | 370/329 |
| 2014/0256341 A1* | 9/2014 | Nayeb Nazar et al. | 455/452.1 |
| 2014/0341093 A1* | 11/2014 | Seo | 370/280 |

FOREIGN PATENT DOCUMENTS

| | | |
|---|---|---|
| WO | 2011083774 A1 | 7/2011 |
| WO | 2013138792 A1 | 9/2013 |

OTHER PUBLICATIONS

LG Electronics, "Discussions on interference coordination between CaMP clusters", R1-113980, 3GPP TSG RAN IVG1 Meeting #67, San Francisco, USA, Nov. 14-18, 2011.

ZTE, "CSI-RS configurations for CaMP', R1-113762, 3GPP TSG RAN IVG1 Meeting #67, San Francisco, USA" Nov. 14-18, 2011.

* cited by examiner

INTERFERENCE MITIGATION IN THE CONTEXT OF HETEROGENEOUS NETWORKS WITH COORDINATED TRANSMISSION POINTS WITH A COMMON TRANSMISSION POINT IDENTITY

RELATED APPLICATIONS

This application claims the benefit of and hereby incorporates by reference U.S. Provisional Patent Application Ser. No. 61/612,188, filed Mar. 16, 2012.

BACKGROUND

Demand for bandwidth within Wireless Wide Area Networks (WWAN) standards is always increasing. Also, more data intensive services, such as streaming video, and higher volumes of localized traffic create demand for improved uniformity of service across WWANs, including near boundaries between wireless communication towers (tower). To address these demands, spectrum is being reused by wireless communication towers (tower) that are closer and closer together.

Additionally, WWANs have come to support heterogeneous networks of towers. These heterogeneous networks use relatively low power towers within the coverage area of relatively more powerful towers. The relatively low power towers can improve the uniformity of coverage in high traffic areas and/or in regions poorly covered by the relatively more powerful towers. They can also increase bandwidth by offloading some of the traffic from the relatively more powerful towers.

As another approach to improving the uniformity of service, towers can be grouped into coordinated clusters. The clusters can be coordinated to allow multiple towers to transmit to and receive transmissions from a single wireless device. Combining reception and transmission capabilities from multiple transmission points can improve services for wireless mobile devices, particularly at the boundaries between the coverage areas of adjacent towers.

However, each of these approaches to increasing bandwidth also increases the complexity of WWANs. Not only do these approaches, involving closer reuse of frequencies, overlapping coverage areas, and increased transmissions, increase complexity, they increase the potential for interference and other problems. Furthermore, solutions to such increased potential for interference become limited to the narrow confines resulting from the increased complexity.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
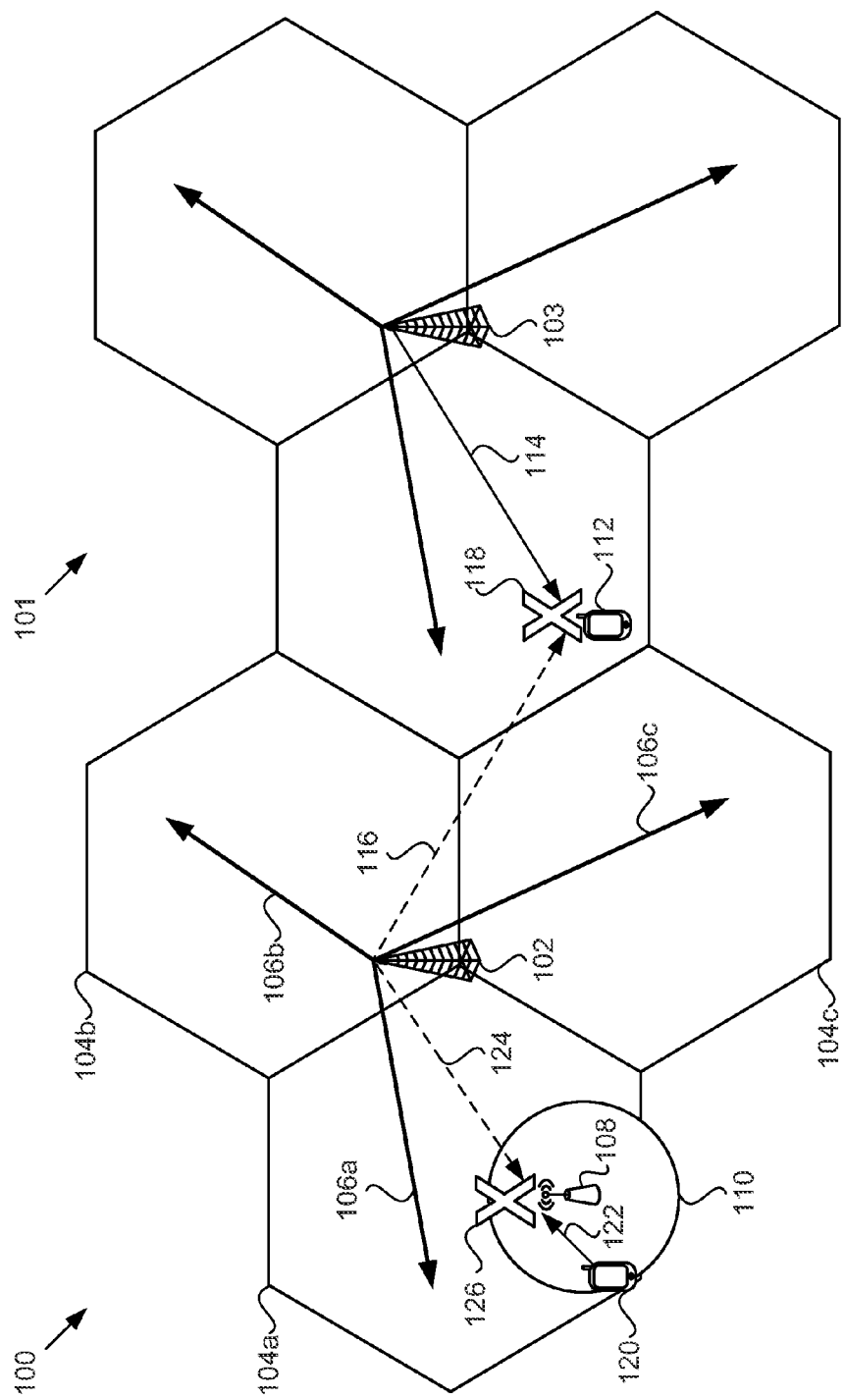
FIG. 1 is a block diagram illustrating a pair of high-power transmission points within a Wireless Local Area Network (WLAN) where frequency reuse by geographically proximate transmission points and overlapping coverage areas of heterogeneous transmission points create potential for various forms of interference in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

Different terminology for wireless mobile devices is used in different specifications. As used herein, a wireless mobile device can be a User Equipment (UE) or a Mobile Station (MS), among other possibilities. Throughout this application, the terms wireless mobile device, UE, and MS can be used interchangeably.

As used herein the term "cellular radio tower" is defined as a wireless communication device in a Wireless Wide Area Network (WWAN) configured to communicate with a plurality of wireless mobile devices located within a geographic region referred to as a cell. Different terminologies for cellular radio towers are used in different specifications. Terminology used for different variations of a cellular radio tower can include, but is not limited to, a Base Station (BS), an evolved Node B (eNodeB or eNB), a WWAN transmission point, a transmission point, and a WWAN node. The terms are used interchangeably, unless otherwise noted. The actual definition of a BS or eNodeB is provided in their Institute of Electronics and Electrical Engineers (IEEE) 802.16 and Third Generation Partnership Project (3GPP) specifications.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

Wireless Wide Area Networks (WWAN) can involve homogeneous and heterogeneous networks with overlapping and abutting coverage areas for different kinds of transmission points therein to increase spectral efficiency. To avoid the interference problems that can result from these overlapping and abutting coverage areas, approaches have been developed to coordinate transmission on different frequencies and at different times. In the context of 3GPP, coordination on different frequencies is implemented with the standards for Inter-Cell Interference Coordination (ICIC). With respect to time, interference coordination, especially for communication resources with fixed frequency allocations, is implemented with the standards for enhanced ICIC (eICIC).

However, these frequency and time based approaches, like ICIC and eICIC, coordinate transmissions on the basis of transmission point identity. Some heterogeneous network scenarios, however, cluster multiple transmission points with the same identity. The nature of some transmission points, such as RRHs, lend these transmission points to share a transmission point identity with another transmission point, such as an eNodeB, upon which they are dependent. Unfortunately, applying legacy approaches to frequency and time coordination based on transmission point identity leads to confusion and problems where multiple transmission points share the same identity. These problems can extend to secondary functions related to the coordination of transmissions, such as measurements used to provide feedback information.

The approaches, such as ICIC and eICIC, can be extended, however, to scenarios where multiple transmission points share the same transmission point identity. Different approaches can be used to generate messages about power levels at which different transmission points are scheduled for different ranges of frequencies. These messages can be based on characteristics, or attributes, other than transmission point identity. These characteristics/attributes can differentiate/distinguish transmission points sharing a common transmission point identity. The messages can be communicated between adjacent clusters of transmission points to coordinate transmissions on different frequencies in non-interfering ways.

With respect to time-based coordination of transmissions, multiple transmission points with a common transmission point identity can be problematic for related feedback measurements. These measurements can be based on reference signals that are configured and allocated based on transmission point identity. As a result, multiple transmission points can transmit the same reference signals allocated to the same resources, leading to confused and inaccurate measurements.

To address these inaccuracies, new sets of reference signals can be configured to correlate to different transmission point characteristics/attributes, aside from transmission point identity. These new, correlated reference signals can be used to decouple reference signals from different transmission points with the same transmission point identity. Decoupled reference signals can then lead to accurate measurements, which can lead to accurate feedback. Additional details for approaches to extend legacy approaches to frequency and time coordination to scenarios where multiple transmission points share a common transmission point identity are discussed below.

FIG. 1 illustrates a pair of coverage areas 100, 101 for a pair of relatively high-power transmission points 102, 103, together with an additional coverage area 110 for a relatively low-power transmission point 108 within the coverage area of the first high-power transmission point 102. The proximity of the pair of high power transmission points can give rise to inter-coverage-area interference 118. Similarly, overlapping coverage areas 100, 110 of heterogeneous transmission points 102, 108 can create a potential for intra-coverage-area interference 126.

The first high-power transmission point 102 can be a Base Station (BS) and/or a MaCro-Node (MCN) evolved Node (eNodeB), as is also true of the second high-power transmission point 103. As used herein, the term high-power transmission point can be replaces with the term MCN and vice versa. The relatively low-power transmission point 102 can be a Low Power Node (LPN). As used herein, an LPN can be one of a micro cell, a pico cell, a femto cell, a home eNodeB cell (HeNB), a Remote Radio Head (RRH), a Remote Radio Equipment (RRE), and a repeater. As used herein, the term low-power transmission point can be replaced with the term LPN, or any of the above enumerated variations, and the term LPN can be replaced with the term low-power transmission point. Furthermore, as an important statement of the generality of embodiments discussed in this disclosure, while the terminology of the Third Generation Partnership Project (3GPP) Long Term Evolution (LTE) standard is often used throughout this specification, it is not intended to be limiting, and there are exceptions in the use of more general terminology in portions of this specification to further communicate this point.

The first coverage area 100 comprises a set of three different substantially hexagonal cells 104a-c. As used herein, the term cell refers to a geographic region over which a transmission point can communicate with wireless mobile devices.

The three cells result from three transmission directions 106a-c from the first high-power transmission point 102, the centers of which are depicted with three arrows in FIG. 1. The second high-power transmission point/MCN 103 also has a coverage area 101 defined by three substantially hexagonal cells resulting from three different directions of transmission, as depicted.

Unfortunately, a first wireless mobile device 112, which can be a User Equipment (UE), at the boundary between the second coverage area 101 and the first coverage area 100, can experience inter-coverage-area interference 118. For example, an intended Down Link (DL) transmission 114 for the first UE can be transmitted from the second MCN 103 to the first UE. However, the first UE can also be illuminated by leaking DL transmissions 116 from the first MCN 102. In the scenario depicted in FIG. 1, these leaking DL transmissions can result in the inter-coverage-area interference 118.

As another example of inter-coverage-area interference 118, problems can also result in scenarios where an Up Link (UL) transmission from the first UE 112 as received at the second MCN 103 is received together with leaking DL transmissions from the first MCN 102. Additionally, inter-coverage-area interference can include interference from more than one adjacent eNodeBs/transmission points. In some instances, LPNs can also contribute to the problem.

Intra-coverage-area interference 126 can also be a problem. The WWAN depicted in FIG. 1 can be described as heterogeneous because of the different types of transmission points therein. Within the coverage area 100 of the first transmission point 102, in the first cell 104a, the LPN 108 creates an additional coverage area 110. This additional coverage area can provide better uniformity of service to a high concentration of localized traffic and/or provide improved uniformity on a boundary that may only be weakly covered within the first cell 104a.

However, the overlap of the first cell 104a by the additional coverage area 110 can result in various forms of intra-coverage-area interference 126. For example, a second UE 120 in the additional coverage area 110 can send an UL transmission 122 to the LPN 108. However, this UL transmission can be interfered with by leaking DL transmissions 124 from the first MCN 102. In an alternative example, the leaking DL transmissions can interfere with DL transmissions from the LPN to the second UE. Interference from additional transmission points can also add to the problem.

The spatial proximity and overlap demonstrated in FIG. 1, corollaries of technologies employed to improve bandwidth and uniformity of coverage, contribute to the potential for interference. However, they are not the only factors in determining whether interference can occur. Interfering transmissions and receptions of transmissions also involve overlap with respect to time and frequency. Radio resources, with respect to time and frequency, for transmission and reception in many contemporary WWANs are defined by a version of an Orthogonal Frequency Division Multiplexing (OFDM) modulation scheme.

Figure 2:
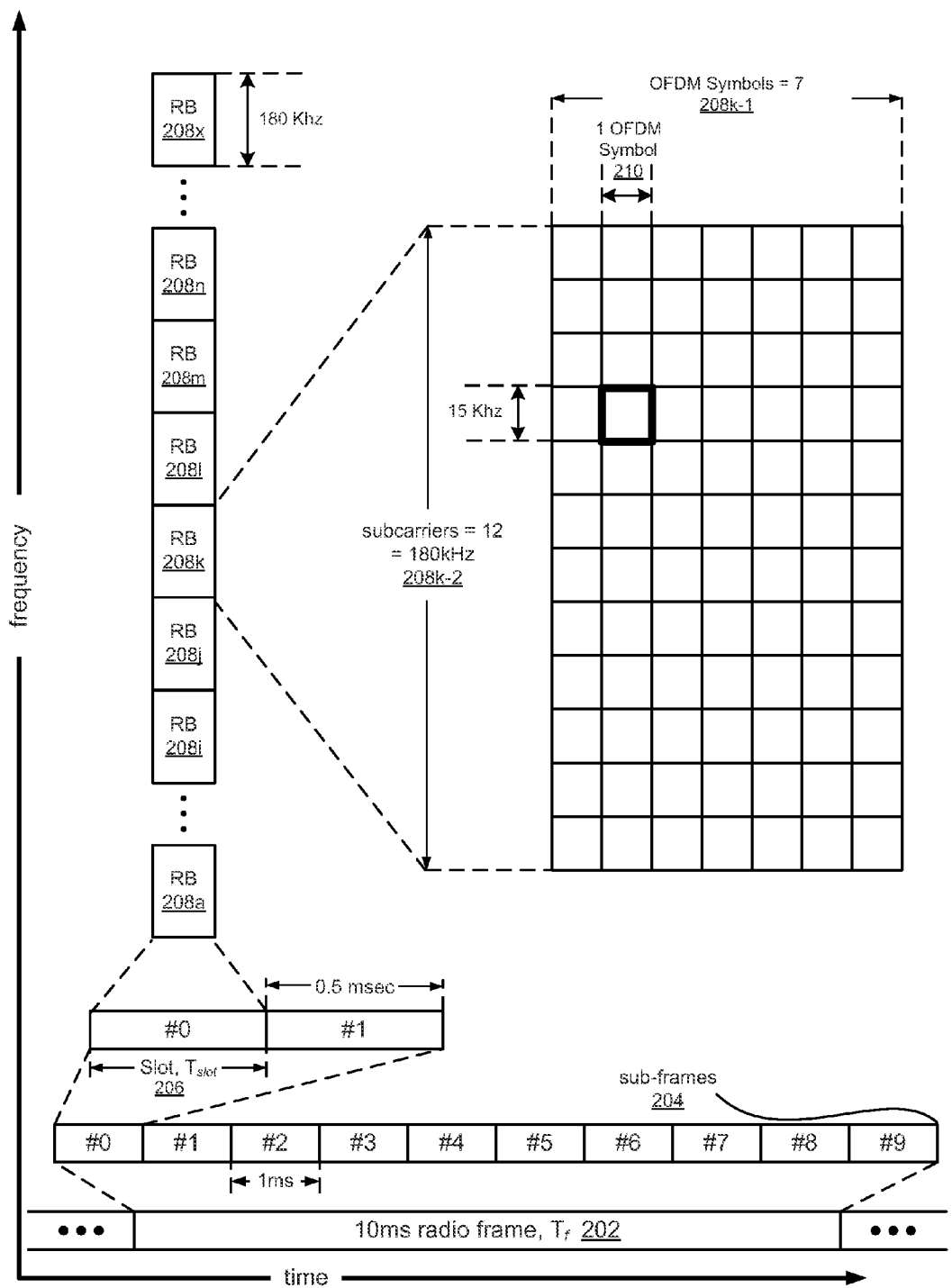
FIG. 2 is a block diagram illustrating Physical Resource Blocks (PRB) within an Orthogonal Frequency Division Multiplexing (OFDM) modulation scheme that can be used to mitigate inter-coverage-area interference in accordance with an example.

FIG. 2 depicts divisions with respect to time and frequency delineating an example OFDM modulation scheme for one type of DL transmission according to 3GPP LTE. However, other OFDM and non-OFDM modulation schemes are possible. With respect to time in the example, a single radio frame 202 is depicted from a stream of frames, defined to comprise 10 milliseconds (ms) of downlink transmission signals. A frame can be segmented or divided into ten sub-frames 204 that are each 1 ms long. A sub-frame can be further subdivided into two slots 206, a slot having a duration of 0.5 ms.

The 0.5 ms duration of a slot 206 can coincide with the temporal duration of a Physical Resource Block (PRB or RB) 208a-x. A PRB, as further defined in 3GPP TS36.211, Sections 5.2.3 and 6.2.3, can be the smallest unit of resource allocation assigned by a transmission point scheduler unit within 3GPP LTE standards. Other standards define analogous units, for purposes of resource assignment, with respect to time and frequency. In addition to its 0.5 ms temporal span, a PRB also spans a range of frequencies. Individual PRBs have distinct frequency spans, as depicted by the ascending series of PRBs with respect to frequency in FIG. 2.

More specifically, an individual PRB $208a$-$x$ can include 12 different 15 kHz subcarriers $208k$-$2$ (on the frequency axis) and 6 or 7 OFDM symbols $208k$-$2$ (on the time axis) per subcarrier. The various subcarriers and OFDM symbols with respect to frequency and time dimensions can create a grid of 84 resource elements (REs) 210, where a PRB $208k$ comprises 7 OFDM symbols. An RE can transmit different amounts of bits depending on the modulation used, from a single bit in the case of Bi-Phase Shift Keying (BPSK) to six bits for 64 Quadrature Amplitude Modulation (QAM) or 64 QAM.

The differing frequencies corresponding to different PRBs $208a$-$x$, or other analogous units of resource allocation, can be used to avoid interference problems. A little coordination between transmission points can make this interference avoidance possible. The following figure can be used to illustrate.

Figure 3:
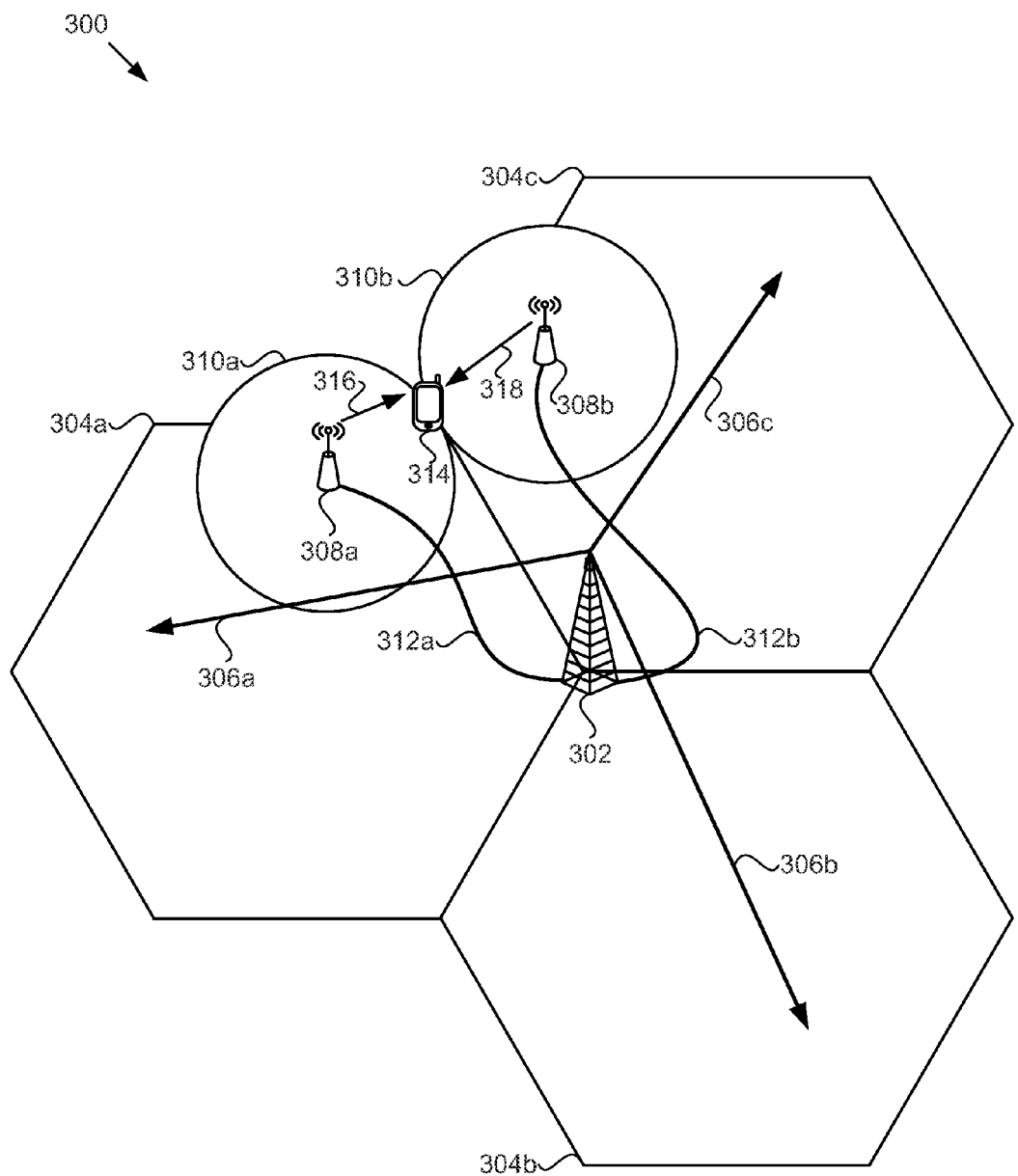
FIG. 3 is a block diagram illustrating Joint Transmission (JT) and/or Dynamic Point Selection (DPS) within a Coordinated Multi-Point (CoMP) environment in accordance with an example.

FIG. 3 depicts a portion of a WWAN that can be coordinated. In 3GPP LTE standards, such coordination can be referred to as Coordinated Multi-Point (CoMP). Similar to FIG. 1, FIG. 3 depicts a coverage area 300 for a high-power transmission point, which can be an MCN eNodeB 302. The coverage area comprises a set of three different substantially hexagonal cells 304a-c that result from three different transmission directions 306a-c. Also within the coverage area is a first relatively low-power transmission point 308a, which can be an LPN, and a second relatively low-power transmission point 308b, which can also be an LPN.

The first LPN 308a and the second LPN 308b result in a first additional coverage area 310a and a second additional coverage area 310b. The first LPN 308a can be configured to communicate with the MCN 302 over a first backhaul link 312a. Additionally, the second LPN 308b can be configured to communicate with the MCN 302 over a second backhaul link 312b. Additionally, a backhaul link could be established between the first LPN and the second LPN.

The coordination facilitated over various backhaul links 312 can be used in various ways. For example, it can be used to increase uniformity of service. Near the boundary areas of the coverage area 300 and the first and second additional coverage areas 310a, 310b is a wireless mobile device 314, which can be a UE. Due to the geographic location of the UE, difficulties can arise in providing the same uniformity of coverage for the UE as it might receive at another location.

To improve the uniformity of coverage, the backhaul links 312 can be used to coordinate a first transmission 316 from the first LPN 308a co-phased with a second transmission 318 from the second LPN 308b to the UE 314. As co-phase transmissions, the first and second transmissions can be transmitted simultaneously. In accordance with 3GPP LTE, such a simultaneous transmission is referred to as a Joint Transmission (JT). An analogous approach can be taken with respect to joint reception of UL transmissions from the UE. Alternatively, the transmission point for transmission to the UE, or reception from the UE, can be changed dynamically with the aid of the coordinating backhaul links depending on changing channel qualities. In 3GPP LTE, such dynamic changes are referred to as Dynamic Point Selection (DPS).

The coordination facilitated over various backhaul links 312 can also be used to capitalize on the differing frequencies corresponding to different PRBs 208a-x, or other analogous units of resource allocation. As used herein, the term "PRB" can replaced with the phrase "units of resource allocation," "resource block," and similar terms and vice versa. For example, the power levels for which the MCN 302 is scheduled to transmit on various frequency-dependent units of resource allocation/PRBs can be communicated over backhaul links between the MCN and the LPNs 308a, 308b. With this information, the first LPN 308a can schedule a first LPN transmission 316 for a wireless mobile device 314, which can be a UE, at different frequencies from those at which the MCN is scheduled to transmit at high power levels to avoid interference. The second LPN 308b can do the same with a second transmission 318. A similar approach can be used between multiple LPNs and/or MCNs. Communication of scheduled power levels at different frequencies is known as ICIC in 3GPP LTE.

At different frequencies, the spatial proximity and overlap depicted in FIG. 1 no longer present potential scenarios for interference. However, as WWANs become more and more complicated to increase bandwidth and uniformity of service, among other objectives, coordination of frequency transmissions also becomes more complicated. One example of an additional complication is described with the help of the following figure.

Figure 4:
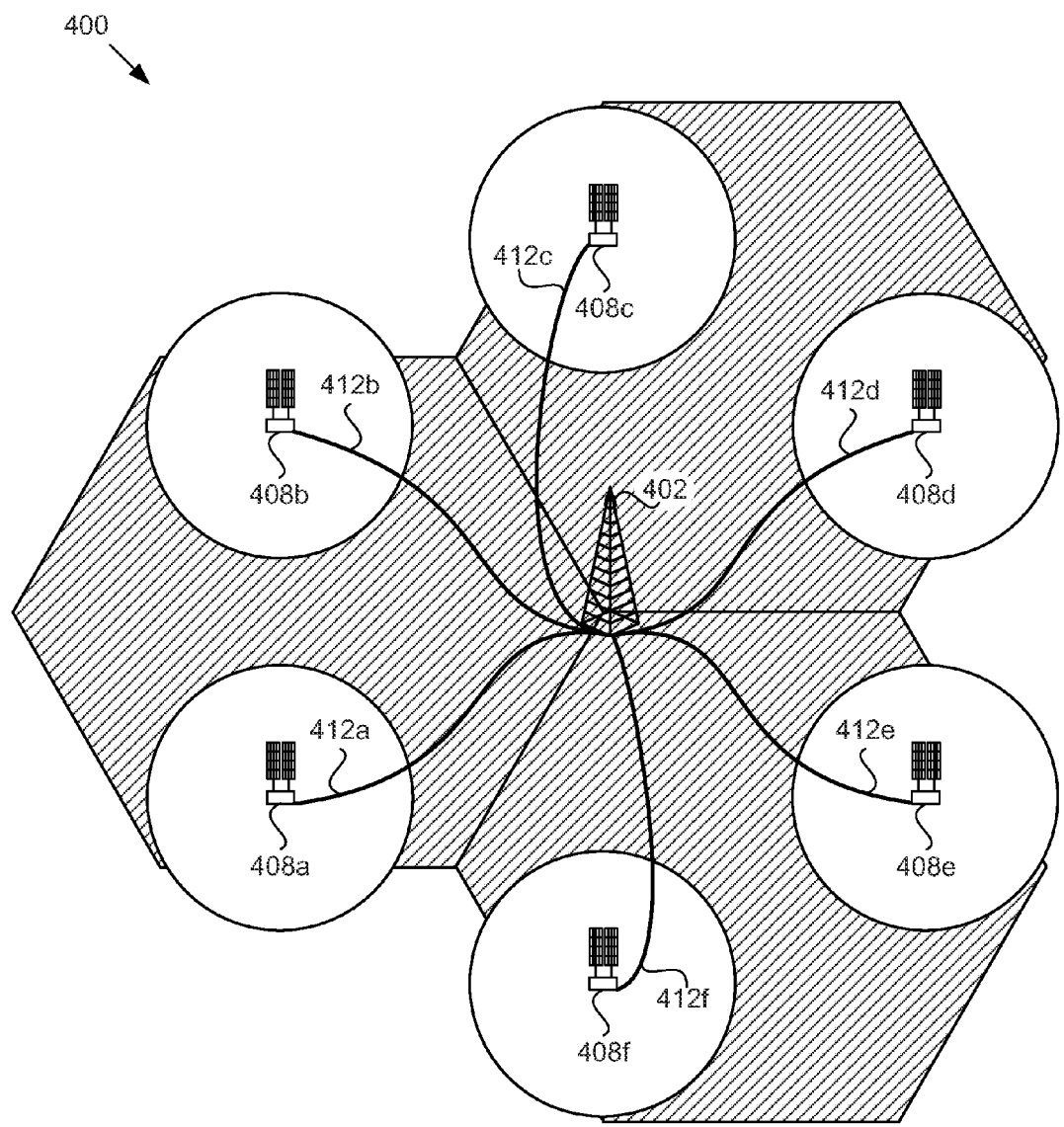
FIG. 4 is a block diagram illustrating an example of a CoMP scenario in which distributed transmission points can share a common identity in accordance with an example.

FIG. 4 is a block diagram illustrating scenarios in which distributed transmission points complicate interference avoidance by sharing a common identity across distributed transmission points. Again, a coverage area 400 for a relatively high-power transmission point 402, which can be an MCN, is depicted. Within the coverage area, several relatively low power transmission points 408a-f are depicted. The relatively low power transmission points can be Remote Radio Head (RRH) transceivers.

The RRH transceivers 408a-f can each include a backhaul link 412a-f to the MCN 402 to communicate information and/or coordinate transmissions. The backhaul links can also serve to connect the RRH transceivers to their respective control panels, residing at a common transmission point/MCN eNodeB 402. Not only do the controlling entities of the RRH transceivers reside at the remote eNodeB, but the RRH transceivers share their identity as transmission points with that eNodeB 402. Other types of transmission points can also share this same characteristic/attribute of a shared transmission point identity common to multiple distributed transmission points. The distributed RRHs within the coverage area 400 of the common eNodeB 402, as depicted in FIG. 4, are consistent with CoMP scenario 3 and 4 of 3GPP LTE.

Scenarios, such as that depicted in FIG. 4, in which a single transmission point identity is shared among multiple distributed transmission points can be advantageous. For example, allocation of resources for reference signals and/or control signals can be based on transmission point identity. A common transmission point identity, therefore, results in common resource allocations. The common resource allocations at different transmission points can avoid collisions between these reference and/or control signals with other information, such as data, from other transmission points in a coordinated transmission scenario.

For example, in 3GPP LTE CoMP scenarios 3 and 4, a common transmission point identity results in a common resource allocation for Cell-specific Reference Signals (CRS). In 3GPP LTE, an Evolved-Universal Terrestrial Radio Access Network (E-UTRAN) Cell Global Identifier (ECGI) provides an example of a transmission point identity. The common resource allocation at all transmission points in a coordinated cluster of transmission points for CRS can avoid collisions with resource allocations for Physical Downlink Shared Channels (PDSCH) at different transmission points also within the coordinated cluster. Other examples are also possible.

However, common transmission point identities can complicate various forms of interference arising from the spatial proximity and overlap depicted in FIG. 1. As discussed in more detail below, common transmission point identities complicate the approaches to interference mitigation with respect to transmission frequency scheduling and feedback measurements with respect to transmission timing.

Figure 5:
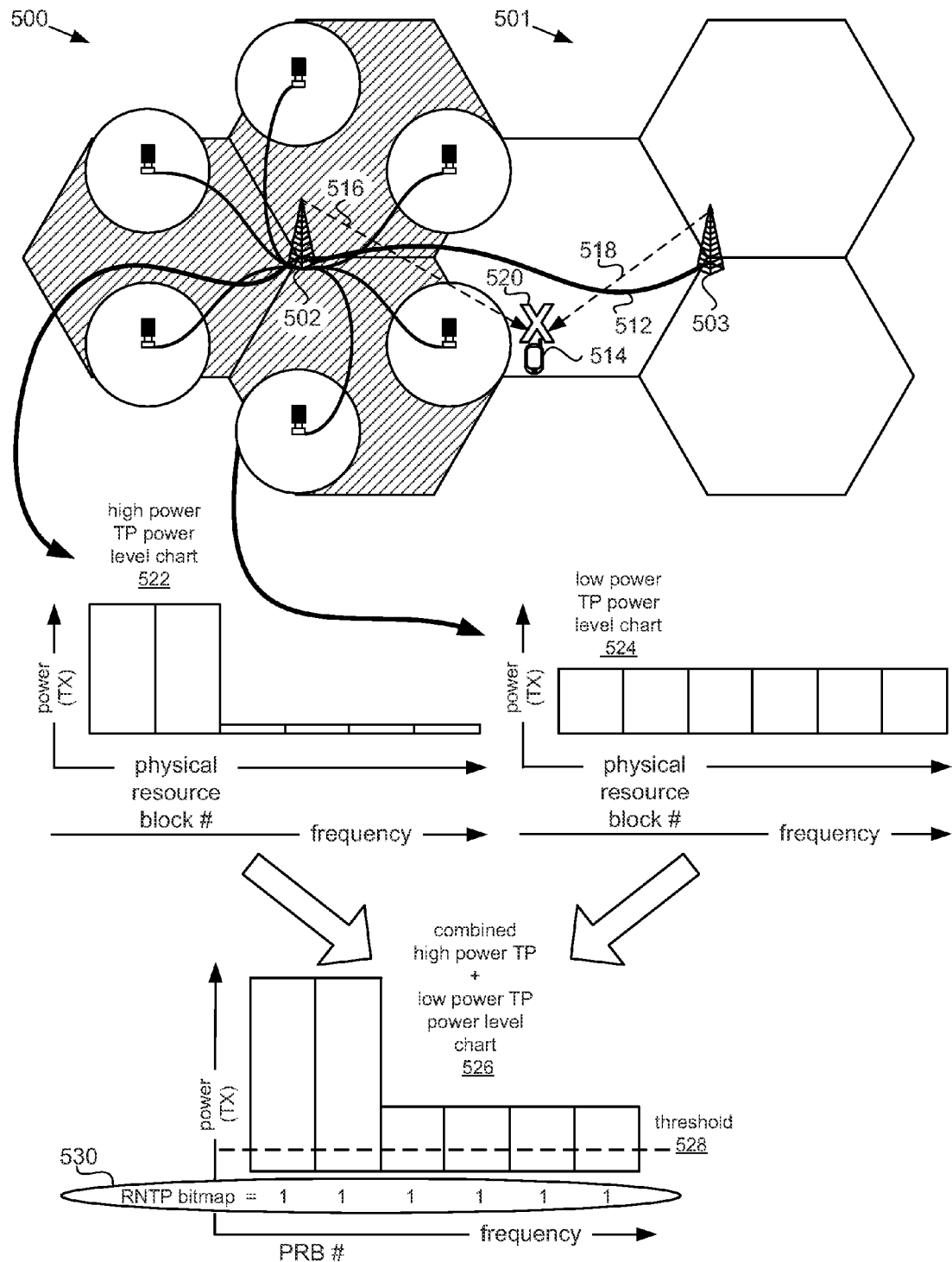
FIG. 5 is a block diagram illustrating the formation of a shared transmission power message for high- and low-power transmission points that cannot reliably report interference-avoiding transmission opportunities to an adjacent tower.

FIG. 5 depicts the formation of a shared transmission power message 530 for high and low power transmission points with a common transmission point identity. Unfortunately, however, a shared transmission power message may not reliably report interference-avoiding transmission opportunities to an adjacent transmission point, as explained below. In FIG. 5, a pair of coverage areas 500, 501 is shown for a pair of high-power transmission points 502, 503, which can each comprise an MCN.

As with FIG. 4, within the first coverage area 500, several RRHs, or other transceivers sharing a common transmission point identity with the MCN 502, are depicted. A backhaul link 512, over which frequency dependent information about power levels can be communicated, can exist between the first MCN and the second MCN. A chart 522 of various transmission power levels with respect to frequency dependent units of resource allocation/PRBs for the first MCN is also shown. Additionally, a similar chart 524 of various transmission power levels with respect to frequency dependent units of resource allocation/PRBs for the low-power RRHs is provided.

The chart 522 for the first MCN 502 indicates that the first two PRBs, with relatively low frequency values in their corresponding frequency ranges, are scheduled to be transmitted at high power levels. The remaining PRBs, however, are scheduled to be muted at low power levels. Conversely, the chart 524 for the RRH transceivers indicates all PRBs are schedule for transmission at power levels commensurate to high power levels for the RRH transceivers. Since the RRH transceivers are not capable of transmitting at power levels as high as those of the MCN, the power levels for the scheduled PRBs are somewhat lower than those for the MCN. The power levels at which the RRH transceivers are scheduled to transmit are communicated over backhaul links between the first MCN 502 and RRH transceivers, similar to the backhaul links 412 described with respect to FIG. 4.

In an effort to reduce inter-coverage-area interference, the first MCN 502 can communicate a transmission power message 530 to the second MCN 503 over the backhaul link 512 between them. However, since the first MCN and the RRH transceivers share the same transmission point identity, the transmission power message for the shared transmission point identity can include combined transmission power levels with respect to each PRB for both the MCN and the RRH transceivers. A combined power level chart 526 for the combination (indicated by the converging arrows) of transmission power levels at the first MCN and the RRH transceivers is depicted near the bottom of FIG. 5.

The combined power level chart 526 adds the scheduled transmission power level of the two different types of transmission points sharing the same transmission point identification with respect to each PRB. The two different types of transmission points can correspond to the first MCN 502 and the RRH transceivers. Inasmuch as transmission power messages are communicated on the basis of transmission point identities, a transmission power message 530 can then be generated based on these combined transmission power levels. In the scenario depicted in FIG. 5, the various RRH transceivers are scheduled to transmit at the same power levels with respect to each PRB. However, it is possible that individual RRH transceivers could be scheduled to transmit at different power levels for the same PRBs, which would complicate further the transmission power message 526.

To reduce the load caused by repeated transmission power messages communicated over backhaul links 512 and to facilitate the ease of their interpretation, among other reasons, a transmission power message 530 can be configured as a bitmap. Each bit in such a bitmap can indicate, either with a 1 or 0, whether the transmission power level is either above or below a power-level threshold 528 for each PRB at a given frequency range.

One example of such a bitmap based transmission power message 530 in 3GPP LTE is the Relative Narrowband Transmit Power (RNTP) message. Additional details regarding RNTP can be found in the specifications for 3GPP LTE, particularly Technical Standard (TS) 36.213. As in the example depicted in FIG. 5, a single RNTP message is sent for each transmission point identity. Currently, therefore, in CoMP scenario 3 and CoMP scenario 4, the transmission power levels with respect to both the high-power MCN 502 and the low-power RRHs are combined when determining whether a particular PRB over a given range of frequencies is above or below a predetermined threshold. As a result, the RNTP bitmap does not provide accurate information about the frequencies at which the first MCN transmits at high powers and the frequencies at which an adjacent, second MCN 503 could schedule transmissions to avoid interference.

Since the power levels for the RRH transceivers are much less than those of the MCN 502, the second MCN 503 can actually schedule transmissions for the UE without unacceptable levels of interference when the MCN is not transmitting at high power levels, even if the RRH transceivers are transmitting at their highest levels. Therefore, the information provided by the transmission power message 530 can take away opportunities to avoid inter-coverage-area interference. The transmission power message 530 simply indicates that transmission power levels are above the threshold 528 on all PRBs. As a result, the adjacent, second MCN 503 does not know that it could avoid unacceptable inter-coverage-area interference on all but two of those PRBs.

Figure 6:
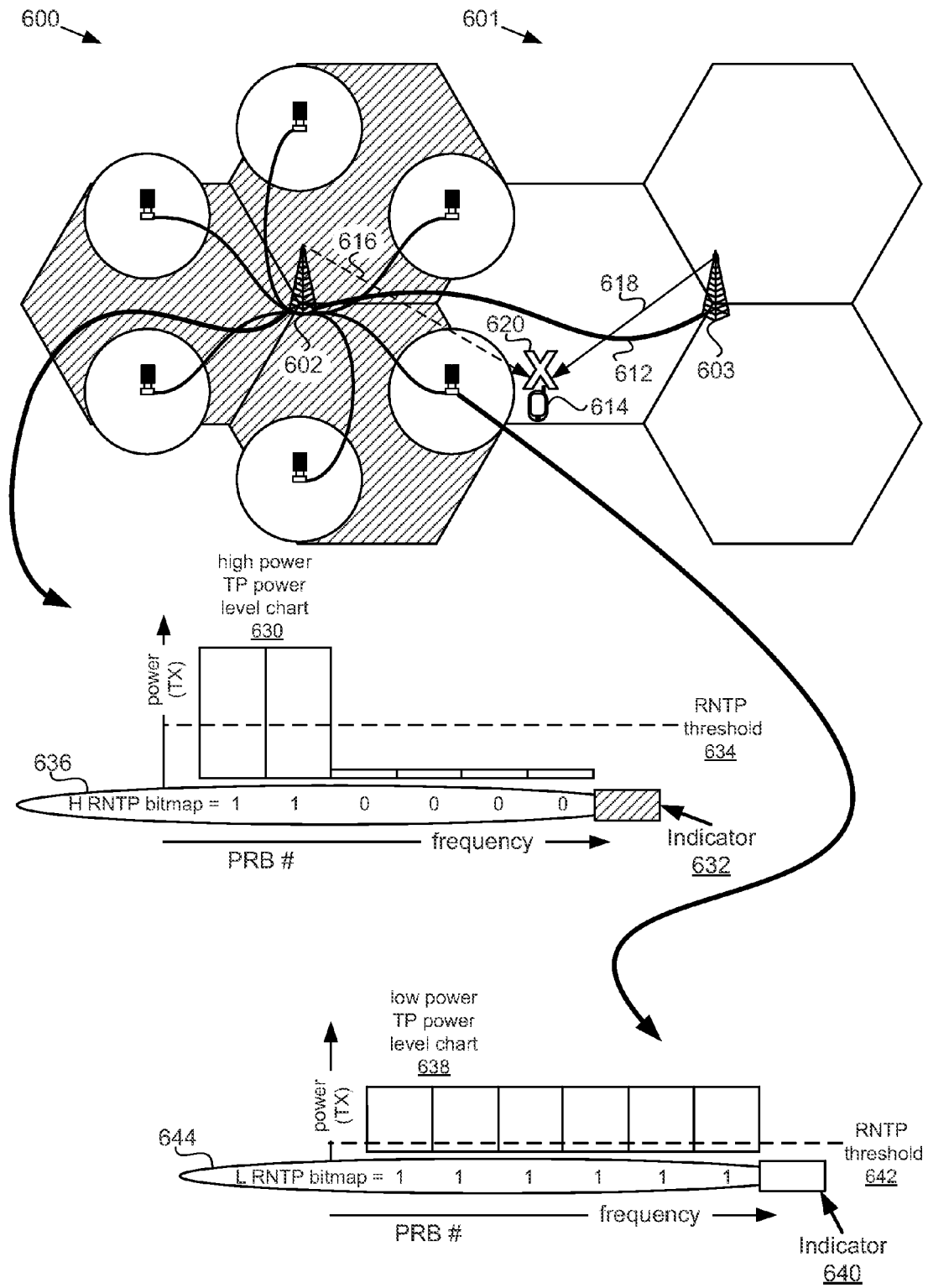
FIG. 6 is a block diagram illustrating the use of multiple transmission power messages to reliably report interference-avoiding transmission opportunities to an adjacent tower in accordance with an example.

FIG. 6, however, depicts the use of multiple transmission power messages 636, 644 to reliably report interference-avoiding transmission opportunities to an adjacent transmission point 603 in accordance with an example. Again, a pair of coverage areas 600, 601 is shown for a pair of high-power transmission points 602, 603, which can each comprise an MCN. As with FIG. 4, within the first coverage area 600, several RRHs, or other transceivers sharing a common transmission point identity with the first MCN 602, are depicted, each with a backhaul link in communication with the first MCN. A backhaul link 612, over which frequency dependent information about power levels can be communicated, also connects the first MCN with an adjacent, second MCN 603.

The first MCN 602 can be scheduled for DL transmissions as a DL transmission point. A high-power transmission point chart 630 for power levels with respect to frequency dependent units of resource allocation/PRBs is provided. As before, the high-power transmission point chart indicates that the first two PRBs, with relatively low frequency values in their corresponding frequency ranges, are scheduled to be transmitted at high power levels. The remaining PRBs, however, are scheduled to be muted.

A low-power transmission point chart 638 is also provided. The low-power transmission point chart reports the power levels for the various PRBs at which low power transmission points, which can be RRH transceivers, are scheduled for transmission power levels and muting. These low-power transmission points can share the same transmission point identity with the first MCN 602.

Unlike in FIG. 5, however, a first transmission power message 636 is formed on the basis of scheduled power levels for the first MCN 602, without combining scheduled power levels for RRH transceivers. The first transmission power message can be configured to indicate a first set of resource blocks, which can be PRBs, that are set for transmission above a first threshold 634 and a second set of resource blocks that are set for muting and/or transmission at or below the first threshold.

The first transmission power message 636 can comprise a bitmap with a bit for each PRB. Each of these bits can indicate whether or not its corresponding PRB is scheduled to be transmitted above the first threshold 634. In the example, ones are used to indicate power levels above the first threshold and zeros to indicate power levels that are not, but these meanings can be switched.

A second transmission power message 644 can be generated in the same way. The second power message can also indicate a first and second set of PRBs based on whether power levels, as indicated in the low-power transmission point chart 638, for particular PRBs are respectively above a second threshold 642, or not. Depending on the embodiment, the first threshold 634 and the second threshold 642 can correspond to different power levels appropriate to the transmission points they are used to provide information for. In some embodiments, power levels can be normalized by a maximum transmission power for transmission points sharing a common transmission point identity before determining whether a power level is above the first or second thresholds.

An indicator 632 can be attached to the first transmission power message 636. The indicator can be configured to identify the one or more attributes of the DL transmission point corresponding to the first transmission power message 636. One non-limiting example of such an attribute can be whether the DL transmission point is a high-power transmission point or a low-power transmission point. The distinction between high-power transmission points and low-power transmission points can be based on the maximum transmission power of the transmission point relative to the maximum transmission powers of other transmission points with a common transmission point identity.

Another non-limiting example of such an attribute can be a transmission point specific identification. Examples of such an identification can include a virtual cell identification and/or an index value within a transmission point index. In such embodiments, individual transmission power messages can be provided for individual transmission points, not just classes of transmission points, within a group of transmission points sharing a common transmission point identity. In such embodiments, individual transmission points can have their own threshold values for purposes of transmission power message formation.

In some embodiments, the transmission points sharing a common transmission point identity can be the various transmission points within a CoMP cluster, such as a CoMP cluster consistent with scenario 3 or 4 of 3GPP LTE. In such embodiments, the high-power transmission point can be an MCN eNodeB. Additionally, the low-power transmission points can be RRHs.

Once the various transmission power messages 636, 644 have been formed, they can be sent over the backhaul link 612 to the adjacent, second MCN 603. Unlike the single transmission power message sent in FIG. 5, at least two transmission power messages are sent 636, 644. The two or more transmission power messages can be distinguished despite a common transmission point identity by the indicators 634, 640 attached thereto.

In the scenario depicted in FIG. 6, the first indicator 632 attached to the first transmission power message 636, indicates that the first transmission power message corresponds to a relatively high-power transmission point 602, such as an MCN. The second indicator 640 attached to the second transmission power message 642, indicates that the second transmission power message reports the transmission power level for relatively low-power transmission points such as RRHs. The first indicator is depicted with a cross-hatched field, and the second indicator is depicted with a solid, blank field to convey that the two indicators indicate different attributes for the transmission points on which they report. Indicators representative of alternative attributes, such as those discussed above are also possible. Although the indicators are located at the tail end of the transmission power messages in FIG. 6, they can be located anywhere within such messages.

Despite a common transmission point identity, the second MCN 603 can distinguish the first transmission power message 636 from the second transmission power message 644 by the first indicator 632 and/or the second indicator 642. Because of the two transmission power messages, the second MCN can determine that although the relatively low power transmission points are scheduled to transmit across all the frequency ranges of the various PRBs, the relatively high power transmission point is only scheduled to transmit at high power levels for the first two PRBs. Therefore, the second MCN can schedule a wireless mobile device 614, which can be a UE, near the boundary between the two coverage areas 600, 601 on a PRB within the same frequency range as a resource block for which the first MCN 602 is set to transmit with a power of less than the power threshold.

With respect to the scenario depicted in FIG. 6, the second MCN 603 can schedule a boundary UE specific DL transmission 618 at frequencies corresponding to any of the third, fourth, fifth and sixth PRBs. Although the low power transmission points are scheduled to transmit within these PRBs, the lower power levels make the interference level 620 acceptable. Conversely, DL leakage 616 from the first MCN at frequencies for the first two PRBs would make the interference level unacceptable because of the relatively high power levels at which the first MCN 602 transmits.

In certain embodiments consistent with 3GPP LTE, the first transmission power message 636 and the second transmission power message 644 can both be RNTP messages configured with one or more indicators 632, 640. In certain embodiments, the absence of an indicator can also be used to indicate that the corresponding transmission power message does or does not have an attribute. In such embodiments, two or more RNTP messages can be communicated to adjacent transmission points, such as the second MCN 603, over a backhaul link 612 comprising an X2 interface.

Although interference can be avoided in part by the scheduling of differing frequencies within the same coverage area or adjacent coverage areas, there are certain communication resources for which this approach is problematic. Such communication resources, such as those used for accessing the WWAN and maintaining a radio link, e.g., synchronization signals, reference signals, and control information, may not be re-schedulable. They may be pre-allocated to occupy a set of frequency resources that wireless devices can rely upon them occupying to allow the wireless devices to use the communication resources for the various functions they serve.

To overcome the problems caused by these immovable resources with respect to frequency, especially within heterogeneous networks, approaches have been developed whereby a transmission point can request that adjacent transmission points provide time slots within which they reduce transmissions. The first transmission point can then use these reduced transmission time slots to schedule transmissions for its own wireless mobile devices, thereby reducing interference problems with the adjacent transmission points. By using time, in addition to frequency, as another resource to avoid overlapping signaling, the communication of immovable resources can proceed without interference. Enhanced Inter-Cell Interference Coordination (eICIC), as introduced in Release 10 of the 3GPP LTE specifications, provides one example of such an approach that uses the time domain to schedule around interference problems.

In eICIC, one eNodeB requests that at least one adjacent eNodeB provide low transmission power time slots. These low transmission power time slots can be provided by reserving certain sub frames, similar to those discussed with respect to FIG. 2, for low power transmissions. As used herein the term "sub-frame" can be replaced by the term "time slot" and vice versa. These sub-frames are known as Almost Blank Sub-frames (ABS). An ABS removes as many transmission resources as possible from the sub-frame to reduce the potential for interference. However, the ABS is referred to as "almost blank" due to remaining transmission resources that can be deemed worth keeping. For example, some transmission resources can be reserved for control information, feedback information, paging information, and/or certain reference signals. ABSs can be arranged in repeating patterns. Transmission points adjacent to a transmission point with a periodic ABS pattern can, therefore, set periodic schedules for transmissions for their associated wireless mobile devices.

Although such time domain approaches to interference mitigation reduce interference and improve channel quality, channel quality can still be an important issue. For example, selection of a modulation scheme, such as BPSK, Quadrature Phase-Shift Keying, 16 Quadrature Amplitude Modulation (QAM) or 64 QAM to transmit increasing numbers of bits in each RE, can depend on channel quality measurement results. Therefore, measurements of channel quality continue to play a role.

The periodic nature of ABS patterns, and similar low power transmission power time slot schemes, can make it important that reference signals used to measure channel quality also be configured with similar patterns. Otherwise, a wireless mobile device making channel quality measurements based on the reference signals may not be able to consistently make measurements on ABSs and non-ABSs. Resources can be allocated for reference signals used for channel quality measurements based on transmission point identity in ways that complicate channel quality measurements, as explained with respect to the following figure.

Figure 7:
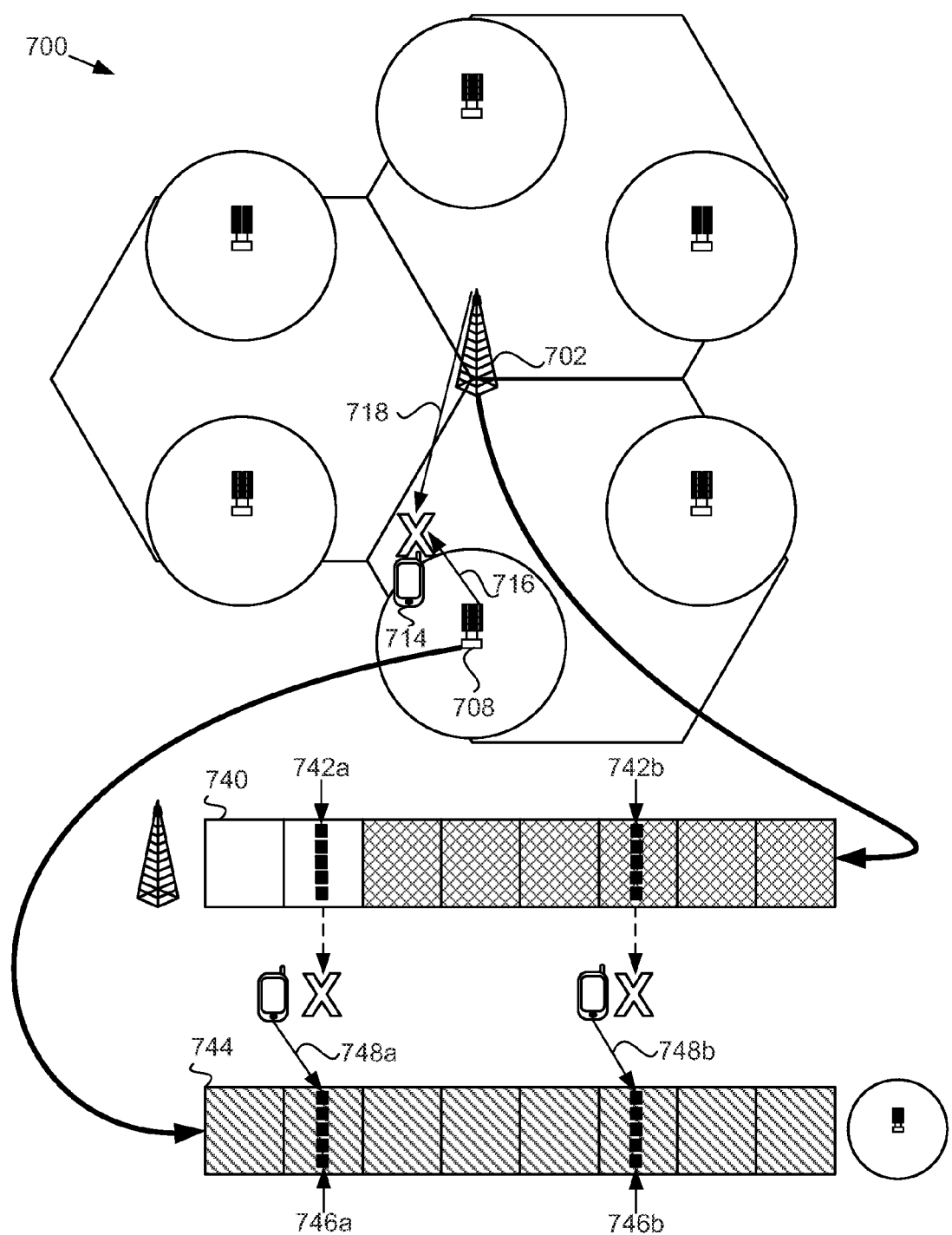
FIG. 7 is a block diagram illustrating coinciding reference signals from high- and low-power transmission points that prevent reliable measurements for channel information.

FIG. 7 illustrates reference signals 742a-b, 746a-b for various transmission points with a common transmission point identity. The reference signals coincide in terms of resource allocation, because of the common transmission point identity, creating problems for reliable measurements for feedback. A coverage area 700 is depicted for a high-power transmission point 702, which can be an MCN. As with FIG. 4, within the coverage area, several RRHs 708, or other transceivers sharing a common transmission point identity with the MCN, are depicted.

A first set 740 of eight sub-frames is depicted corresponding to an ABS pattern, or similar low power transmission power time slot scheme. The first set of eight sub-frames describes the ABS pattern for the MCN 702, as indicated by the MCN icon to the left of the first set of eight sub-frames. The first two sub-frames of first set of eight sub-frames, depicted as solid, blank fields, comprise two ABSs, while the remaining six sub-frames, depicted with diamond cross-hatching, comprise six non-ABSs.

A second set 744 of eight sub-frames is also depicted with diagonal cross-hatching, representative of sub-frames transmitted by the RRHs 708, or other transceivers sharing a common transmission point identity with the MCN 702. However, the second set of eight sub-frames is not configured with an ABS pattern. Rather, the RRHs can use the ABS pattern of the MCN to schedule transmissions for communication resources pre-allocated to occupy set frequency resources in time slots or sub-frames scheduled for ABSs at the MCN. Scheduling these pre-allocated communication resources during these ABSs, can allow the RRHs to mitigate interference even though the additional coverage areas of the RRHs overlap the coverage area 700 of the MCN.

The second set 744 of eight sub-frames is depicted with a pair of reference signals sets 746*a-b* that can be known a priori by, or communicated to a wireless mobile device 714, which can be a UE, within an RRH coverage area. One or more of these reference signal sets can be measured by the UE to evaluate the channel between the UE and the RRH. However, the same pair of reference signal sets 742*a-b* are also allocated to the same time and frequency resources within the transmissions 718 from the MCN 702.

The same pair of reference signal sets 742*a-b*, 746*a-b* can be allocated to occupy the same set of resources within transmissions from the RRH 716 and transmissions from the MCN 718 because the reference signals can be configured and allocated to resources on the basis of transmission point identity. Where reference signals are configured and allocated to resources on the basis of transmission point identity, a UE 714 can correlate measurements, such as channel measurements, to the transmission point pertaining to the transmission point identity. Such reference signals can also be configured and allocated with a periodicity matching the periodicity of an ABS pattern. In the context of 3GPP, CRSs provide one example of reference signals that can be configured and allocated on the basis of transmission point identity with a periodicity equal to that of an ABS pattern.

However, where multiple transmission points share the same identity, confusion can result. With respect to FIG. 7, for example, any channel measurement 748*a-b* for the RRHs 708 based on reference signals 746*a-b* provided by the RRHs can be confused by the same reference signals 742*a-b* of the MCN 702. Although time domain based approaches to interference, such as eICIC, can rely on reference signals configured and allocated on the basis of transmission point identity for channel measurements where one transmission point pertains to a given transmission point identify, multiple transmission points with the same transmission point identity can result in inaccurate measurements.

The clustering of multiple transmission points that share a common transmission point identity is a part of different heterogeneous network scenarios implemented to increase spectral efficiency. Different heterogeneous elements such as RRHs share transmission point identities by their nature. In the context of 3GPP LTE, CoMP scenario 3 and CoMP scenario 4 provide examples of the clustering of multiple transmission points that share a common transmission point identity. These and other scenarios can rely, however, on new approaches by which channel measurements can be obtained.

Figure 8:
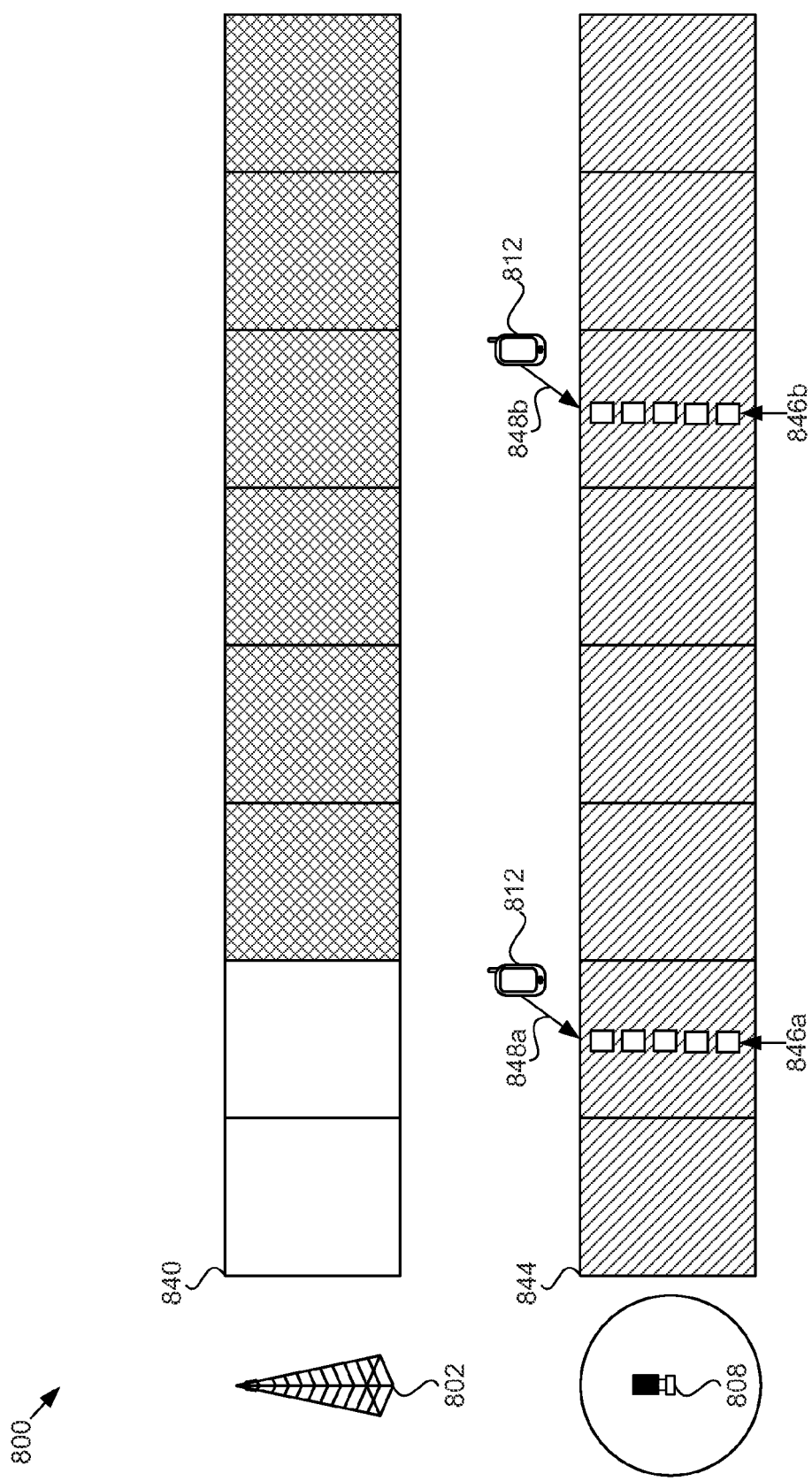
FIG. 8 is a block diagram illustrating the use of pairs of reference signals correlated with one or more transmission point characteristics/attributes and aligned with a blanking pattern to provide reliable measurements for feedback in accordance with an example.

FIG. 8 depicts sets of sub-frames 840, 844 scheduled for transmission from different transmission points sharing the same transmission point identity. As discussed below, the pair of sets of reference signals 846*a-b* depicted in the second set of sub-frames 844 can be used to create accurate measurements and/or channel estimations. The sets of reference signals used for these measurements and evaluations can be configured and based on something other than transmission point identity.

Accurate channel measurements and/or estimations 848*a-b* can be made for RRHs 808, or other transceivers sharing a common transmission point identity with a high-power transmission point 802, such as an MCN. However, a new set of reference signals for use in measuring interference is first configured. This new set of reference signals is not configured and allocated on the basis of transmission point identity alone. Rather, the new set of reference signals can be correlated, with their configuration and/or allocation, to one or more characteristics/attributes of the facilitating transmission point scheduled to transmit them 808. The one or more characteristics/attributes can be used to differentiate/distinguish the facilitating transmission point from at least one other transmission point in a cluster of transmission points sharing the same transmission point identity.

Examples of such characteristics/attributes can include, by way of illustration and not limitation, a node layer or a unique identity for a particular transmission point. The node layer can comprise, without limitation a high power MCN eNodeB 802 or a set of LPNs, such as RRHs 808. Therefore, the reference signals can be configured to be correlated with RRHs, a MCN, or an individual transmission point within a cluster of transmission points. Because such reference signals can be configured and allocated specific to a subset of transmission points within a transmission point cluster, overlapping configurations and allocations with reference signals for transmission points for other portions of the transmission point cluster can be avoided.

Information about the set of reference signals 846*a-b* can then be sent to one or more wireless mobile devices 812, which can be UEs, associated with the facilitating transmission point 808. These UEs can then use the set of reference signals to make interference measurements 848*a-b* specific to one or more transmission points with the characteristics/attributes that can serve as the basis for configuration and allocation of the new set of reference signals 846*a-b*. Additionally, this new set of reference signals can be configured with a periodicity substantially similar to the periodicity for the ABS pattern one or more transmission points 808 with the same transmission point identity, but which do not share the one or more characteristics/attributes correlated with the set of reference signals. Furthermore, the new set of reference signals can be configured with a first subset of reference signals dedicated to measuring interference on ABSs and a second subset of reference signals dedicated to measuring interference on non-ABSs.

In some embodiments, the set of reference signals can be generated with substantially zero power. The received signal at a given UE 812 is equal to the channel multiplied by the reference signal plus noise/interference. Where the reference signal is zero, an estimation of the channel can be avoided because the product of the channel and the zero-valued reference signal will be zero regardless of the channel. The equation can, therefore, be simplified so that the received signal is equal to noise/interference. Thus, that which is measured during the zero-powered reference signals can be attributed to interference from transmission points that do not share the one or more characteristics/attributes to which the new set of reference signals 846a-b has been correlated.

Because the measurements can be decoupled from signals from transmission points that are not of interest, even though they share a common transmission point identity with the transmission points of interest, the measurements can result in more reliable feedback from the wireless devices making the measurements. These measurements can be used to provide more accurate feedback related to transmission points of interest. Similar approaches are possible where the new set of reference signals involve non-zero values. However, a channel estimation can be performed first to be able to subtract out the portion of the received signal that does not pertain to interference from adjacent transmission points.

In the context of 3GPP, one example of a format for reference signals not tied to a particular transmission point identity is the Channel State Information Reference Signal (CSI-RS) format. Radio Resource Control (RRC) signaling can be used by an E-UTRAN, and/or an eNodeB therein, to configure a first set of zero power CSI-RS resources 846a. The first set of zero power CSI-RSs can be configured to correlate to one or more characteristics/attributes of one or more transmission points of interest within a transmission point cluster. In the scenario depicted in FIG. 8, the first set of zero power CSI-RSs, as with a second set of zero-power CSI-RSs 846b to be discussed later, can correlate to RRH transmission points 808. In one non-limiting example, the correlating characteristic/attribute can be that the correlated transmission points pertain to a node layer with low-power transmission points.

The first set of zero-power CSI-RSs 846a can be configured to be allocated in the same sub-frame for which transmission points in the cluster that do not correlate to the first set of zero-power CSI-RSs are scheduled for an ABS, as depicted by the solid, blank field in the first set of sub-frames 840 shown above the first set of zero-power CSI-RSs. A UE 812 can then make a first measurement 848a of the first set of zero-power CSI-RSs to acquire information about interference during ABS.

Similarly, a second set of zero-power CSI-RSs 846b can also be configured with RRC signaling to correlate to RRH transmission points 808. The second set of zero-power CSI-RSs can be configured to be allocated in the same sub-frame for which transmission points in the cluster that do not correlate to the first set of zero-power CSI-RSs are scheduled for a non-ABS, as depicted by the diamond, cross-hatched field in the first set of sub-frames 840 shown above the second set of zero-power CSI-RSs. The UE 812 can then make a second measurement 848b of the second set of zero-power CSI-RSs to acquire information about interference during non-ABSs.

The UE can then use the first and second measurements 848a-b to one or more correlated transmission points to generate feedback to one or more correlated transmission points. Such feedback can take the form of Channel State Information (CSI) and/or Channel Quality Indicators (CQI), to provide some non-limiting examples. Such information can be used to determine modulation schemes and make other decisions assigned to the E-UTRAN and component eNodeBs.

Additionally, both the first set of zero-power CSI-RSs 846a and the second set of zero-power CSI-RSs 846b can be configured with a periodicity equal to the periodicity of an ABS pattern on non-correlating transmission points. In typical eICIC scenarios, the periodicity of the ABS can be 8 ms. In certain embodiments, each set of zero-power CSI-RSs can be configured 4 ms apart. Additional approaches to synchronizing periodicity between ABS patterns and CSI-RS patterns are possible.

If periodic Physical Uplink Control Channel (PUCCH) CSI reporting is configured, reporting parameters, such as cqi-pmiConfigIndex and cqi-pmiConfigIndex2, should be configured to correspond to the first set of zero-power CSI-RSs 846a and the second set of zero-power CSI-RSs 846b. If an aperiodic PUCCH CSI report is triggered by a transmission point, the closest in time of the first set of zero-power CSI-RSs and the second set of zero-power CSI-RSs can be used for the corresponding measurement.

Figure 9:
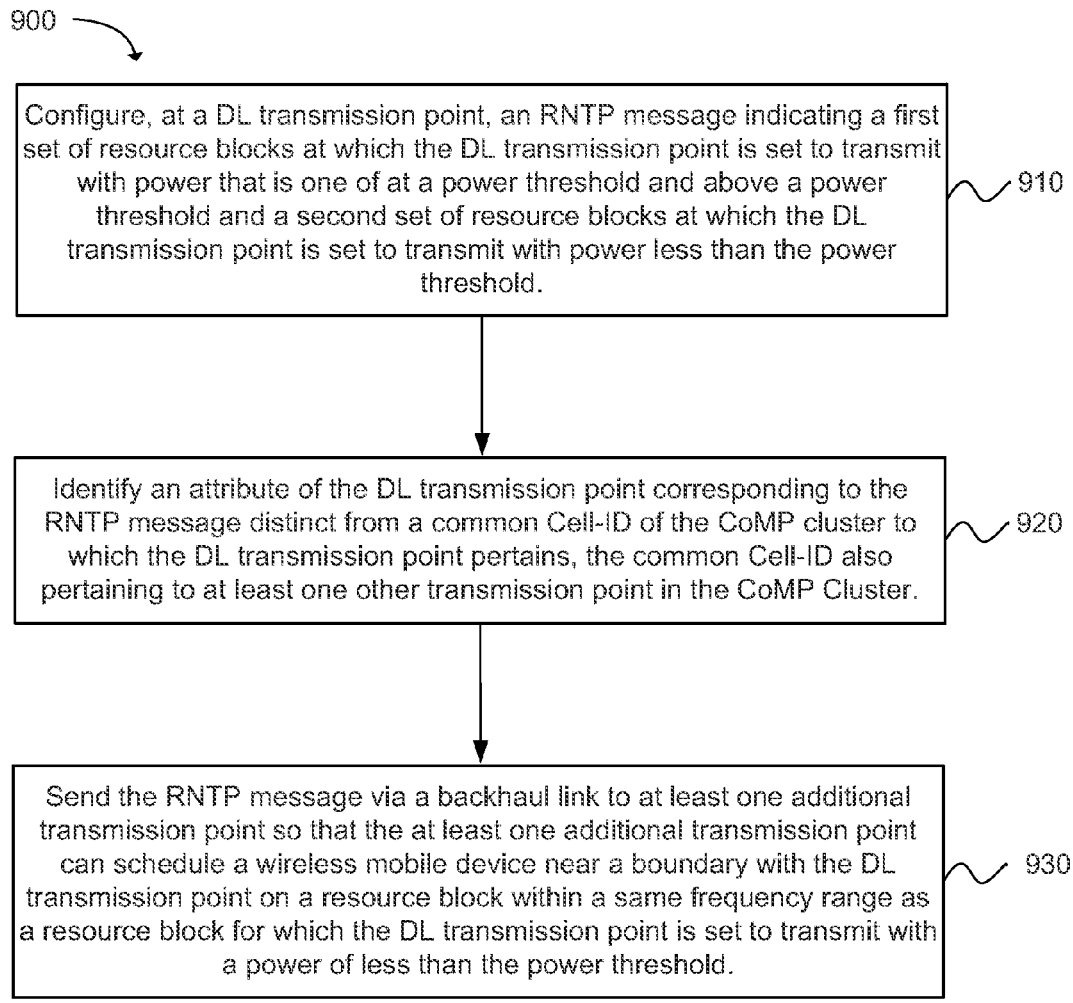
FIG. 9 is a flowchart depicting a process for providing transmission-point specific messages about transmission power levels with respect to frequency ranges to mitigate interference across clusters of wireless transmission points, in accordance with another example.

FIG. 9 is a flowchart of a method 900 to mitigate interference across clusters of wireless transmission points. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 900 can comprise configuring 910, at a DL transmission point, a RNTP message. The RNTP message can indicate a first set of resource blocks at which the DL transmission point is set to transmit with a power that is at a power threshold or above the power threshold. The RNTP message can also indicate a second set of resource blocks at which the DL transmission point is set to transmit with a power less than the power threshold.

Additionally, the method 900 can comprise identifying 920 an attribute of the DL transmission point corresponding to the RNTP message distinct from a common Cell-ID of a CoMP cluster to which the DL transmission point pertains, the common Cell-ID also pertaining to at least one other transmission point in the CoMP cluster. The RNTP message can be sent 930 via a backhaul link to one or more additional transmission points. The one or more additional transmission points can schedule a wireless mobile device near a boundary for the DL transmission point. The wireless mobile device can be scheduled on a resource block within a same frequency range as a resource block for which the DL transmission point is set to transmit with a power of less than the power threshold.

In some embodiments, the attribute of the DL transmission point corresponding to the RNTP message can comprise an indication that the DL transmission point is a high-power transmission point. The attribute can also comprise an indication that the DL transmission point is a low-power transmission point within the CoMP cluster to which the DL transmission point belongs. In certain embodiments, a high-power transmission point can be an MCN eNodeB, and low-power transmission point can be a RRH.

In alternative embodiments, the attribute of the DL transmission point corresponding to the RNTP message can comprise an identification unique to the DL transmission point within the CoMP cluster to which the DL transmission point belongs. In such embodiments, the identification can comprise a virtual cell identification or an index value within a transmission point index. The transmission point index can be defined for transmission points within the CoMP cluster to which the DL transmission point belongs.

Certain embodiments of the method 900 can further comprise normalizing a power that is set for a resource block by a maximum transmission power for transmission in the CoMP cluster to which the DL transmission point belongs. The normalization can be performed before determining whether to include the resource block in one of the first set of resource blocks and the second set of resource blocks. Additionally, in certain examples of the method, the power threshold can be unique to the attribute of the DL transmission point within the CoMP cluster of transmission points to which the DL transmission point belongs.

In some embodiments, backhaul communication of the message can take place over an X2 interface. Additionally, the resource block can include 12 sub-carriers within a PRB.

Figure 10:
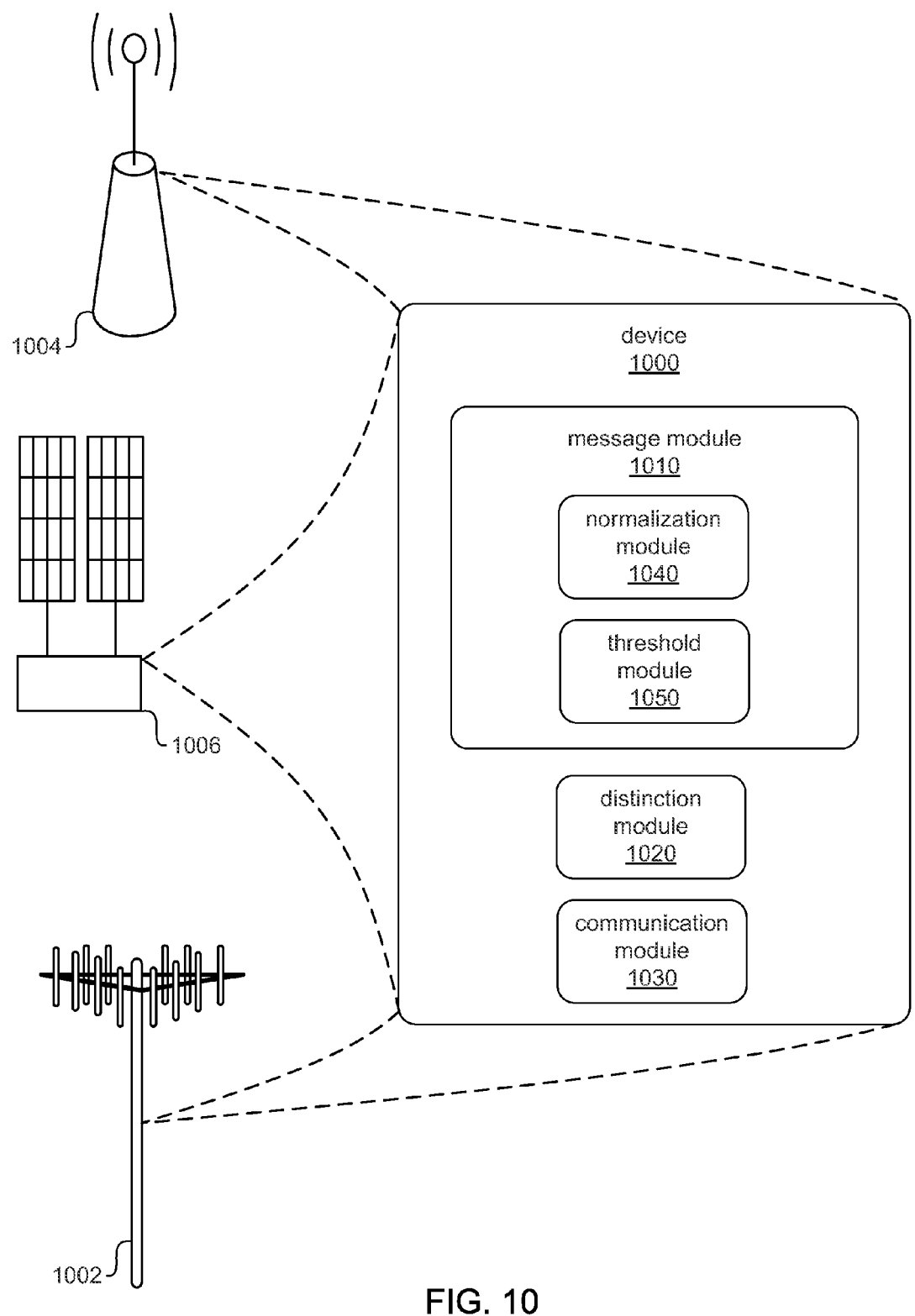
FIG. 10 is a block diagram illustrating a device for reducing interference in a clustering scenario for similarly identified transmission points with different transmission properties, in accordance with an example.

FIG. 10 depicts a device 1000 for reducing interference in a clustering scenario for transmission points for wireless communication, in accordance with an example. The device can reside at a facilitating transmission point such as: a high-power transmission point 1002, such as an MCN, to which a transmission point identity can be assigned, a low-power transmission point 1004, such as an LPN eNodeB, to which a transmission point identity can be assigned; and/or, a transmission point 1006, such as an RRH, to which a transmission point identity is not assigned, but which depends on another transmission point, such as an eNodeB, for its transmission point identity. The device can comprise a message module 1010, a distinction module 1020, and a communication module 1030.

The message module 1010 can be configured to generate an RNTP message. The RNTP message can denote whether at least one resource block from a set of resource blocks is scheduled for DL transmission at a power level that is one of above a predefined threshold, or not above the predefined threshold. The distinction module 1020 can be in communication with the RNTP message module. Furthermore, the distinction module can be configured to provide information for the RNTP message distinguishing the facilitating transmission point from which the RNTP message originates. The facilitating transmission point has a Cell-ID common to at least one other transmission point in a CoMP cluster to which the facilitating transmission point pertains. The communication module 1030, which can be in communication with the distinction module, can be configured to communicate the RNTP message from the facilitating transmission point to one or more adjacent transmission points over one or more backhaul links.

In some embodiments, the distinction module 1020 can provide information distinguishing the facilitating transmission point by providing an indication in the RNTP message as to whether the transmission point is a high power transmission point or a low power transmission point. In certain of such embodiments, the high power transmission point and the low power transmission point can belong to the CoMP, wherein the CoMP cluster facilitates an ability to coordinate transmission activities between transmission points in the CoMP cluster. In such embodiments, the communication module 1030 can communicate the RNTP message to one or more transmission points outside of the CoMP cluster.

In alternative embodiments, the distinction module 1020 can provide information distinguishing the facilitating transmission point by providing a virtual cell identification and/or an index value corresponding to a transmit point index. The virtual cell identification and/or the index value can uniquely identify the facilitating transmission point among the CoMP cluster. Again, the CoMP cluster can be defined by an ability to coordinate transmission activities between member transmission points in the CoMP cluster.

Some devices 1000 can further comprise a normalization module 1040 in communication with the 1010 message module. The normalization module can be configured to normalize a power level of a resource block for the facilitating transmission point. The normalization can be made in terms of a maximum power for the highest power transmission point in the CoMP cluster, wherein the CoMP cluster provides an ability to coordinate transmission activities between member transmission points in the CoMP cluster.

The device 1000 can also further comprise a threshold module 1050, in communication with the message module 1010. The threshold module can be configured to determine a first threshold level for the RNTP message from the facilitating transmission point where the facilitating transmission point corresponds to a relatively high-power level. Also the threshold module can be configured to determine a second threshold for the RNTP message where the facilitating transmission point corresponds to a relatively low power level.

In certain embodiments, the resource block can comprise 12 sub-carriers within a PRB. The backhaul link can be an X2 interface. A high-power transmission point can be an MCN eNodeB.

Figure 11:
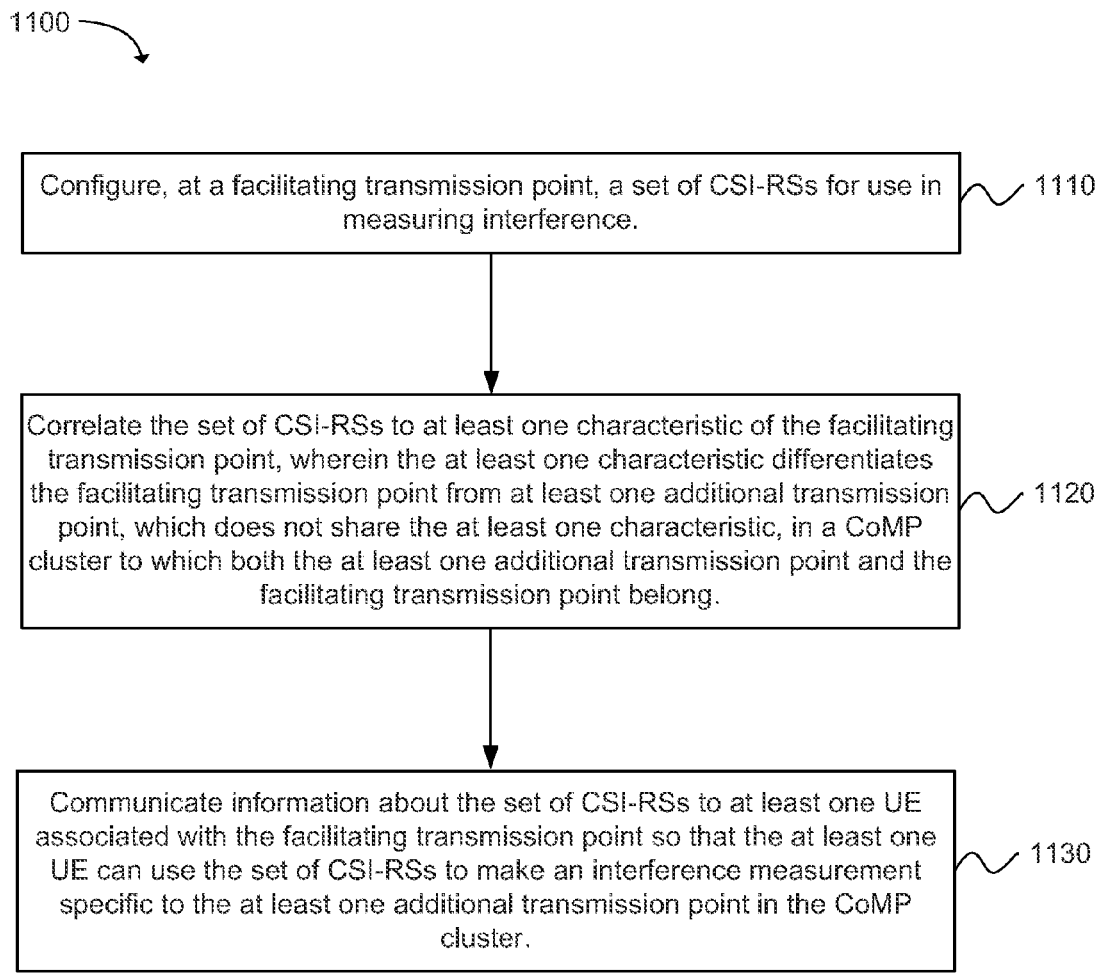
FIG. 11 is a flowchart depicting a process for providing transmission-point specific reference signals for measurements for transmission-point specific feedback within a cluster of similarly identified transmission points with different transmission properties, in accordance with an example.

FIG. 11 is a flowchart of a method 1100 to mitigate interference within the CoMP cluster. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 1100 can comprise determining 1110, at a facilitating transmission point, a set of CSI-RSs for use in measuring interference. The set of CSI-RSs can be correlated 1120 to one or more characteristics of the facilitating transmission point. The one or more characteristics can differentiate/distinguish the facilitating transmission point from one or more additional transmission points. The differentiation can be made because one or more additional transmission points do not share the one or more characteristics of the facilitation transmission point. The one or additional transmission points can be in a CoMP cluster to which the facilitating transmission point belongs. Information about the set of CSI-RSs can be communicated 1130 to one or more UEs associated with the facilitating transmission point. The one or more UEs can use the set of CSI-RSs to make an interference measurement specific to the at least one facilitating transmission point in the CoMP cluster.

In some embodiments, the set of CSI-RSs can be configured for transmission with a periodicity substantially similar to a periodicity for an ABS pattern of the one or more additional transmission points. In certain of such embodiments, configuring the set of CSI-RSs can further comprise configuring a set of CSI-RSs with a first subset of CSI-RSs dedicated to measuring interference on an ABS. Additionally, a second subset of CSI-RSs can be configured to be dedicated to measuring interference on a non-ABS of the ABS pattern of the one or more additional transmission points. In such embodiments, one or more UEs can be configured to provide a periodic measurement report. The periodic measurement report can include a first measurement report for a first measurement of the first subset of CSI-RSs. The second periodic measurement report can also include a second measurement report for a second measurement of the second subset of CSI-RSs.

Certain embodiments can comprise triggering an aperiodic interference measurement at one or more UEs. The aperiodic interference measurement can be configured to be performed on the first subset of CSI-RSs or the second subset of CSI-RSs. Whether the aperiodic interference measurement is made on the first subset of CSI-RSs or the second subset of CSI-RSs can depend on which subset is closest in time to the triggering of the aperiodic interference measurement. Additionally, the set of CSI-RSs can be generated as signals for transmission with substantially zero power. CSI-RSs with substantially zero power can enable the one or more UEs measuring the CSI-RSs to attribute a signal measured on the set of CSI-RSs to interference.

Depending on the embodiment, the one or more characteristics can comprise a first characteristic defined by whether the facilitating transmission point transmits above a threshold power level or a second characteristic. The second characteristic can be defined by an identity of the facilitating transmission point. The identity can correspond to a virtual cell identification or an index value corresponding to a transmission point index. Additionally, the set of CSI-RSs can be configured consistent with a format for CSI-RS. The CoMP cluster discussed above can be a CoMP scenario 3 cluster or a CoMP scenario 4 cluster in such embodiments.

Figure 12:
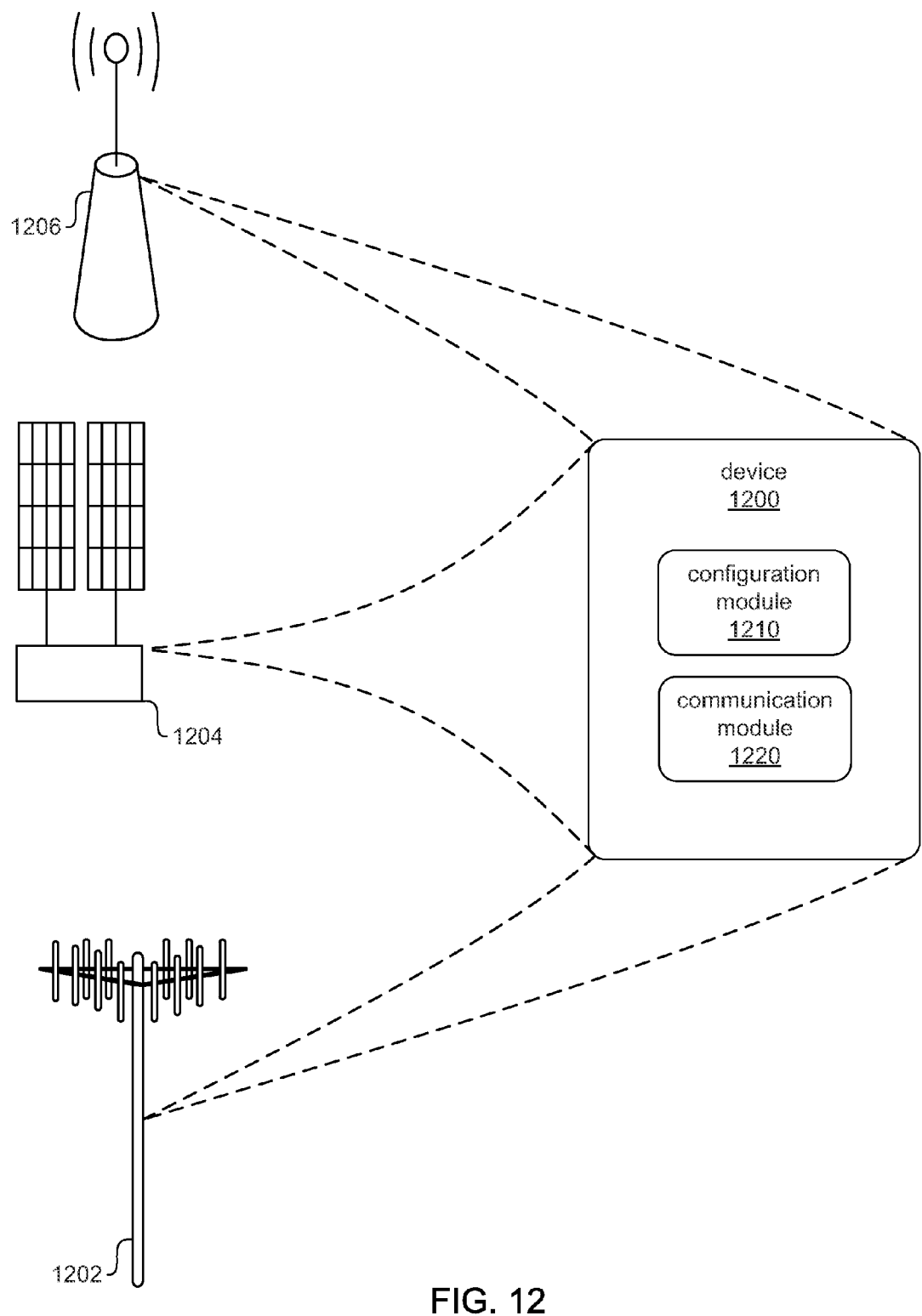
FIG. 12 is a block diagram illustrating a device for mitigating feedback measurement confusions in wireless transmission point clustering scenarios, in accordance with an example; and, FIG. 13 is a block diagram of a UE in accordance with another example.

FIG. 12 depicts a device 1200 for reducing intra-cluster interference in wireless transmission point clustering scenarios, in accordance with an example. The device can reside at a primary transmission point such as: a high-power transmission point 1202, such as an MCN, to which a transmission point identity can be assigned, a low-power transmission point 1204, such as an LPN eNodeB, to which a transmission point identity can be assigned; and/or, a transmission point 1206, such as an RRH, to which a transmission point identity is not assigned, but which depends on another transmission point, such as an eNodeB, for its transmission point identity. The device can comprise a configuration module 1210 and a communication module 1220.

The configuration module 1210 can be configured to configure a set of CSI-RSs specific to a node layer or a particular transmission point in a CoMP cluster to which the primary transmission point belongs. The communication module 1220, which can be in communication with the configuration module, can be configured to communicate configuration information from the primary transmission point to at least one User Equipment (UE) associated with the primary transmission point. The configuration information can allow the UE to make measurements of interference within the CoMP cluster.

In some embodiments, the configuration module 1210 can configure one or more CSI-RSs in the set of CSI-RSs with zero power for transmission. Additionally, the configuration module can configure the set of CSI-RSs specific to the node layer or the particular transmission point in the CoMP cluster in terms of resource allocation for positioning and sequencing of the set of CSI-RSs.

Also with respect to the configuration module 1210, the configuration module can be configured with a periodicity for the set of CSI-RSs with a sub-frame offset to coincide with a periodicity for an ABS pattern of one or more additional transmission point. In this way, interference measurements can be correlated with the ABS pattern. The configuration module can also configure a first CSI-RS group within the set of CSI-RSs on which to measure an ABS and a second CSI-RS group within the set of CSI-RSs on which to measure a non-ABS. The configuration of the first CSI-RS group and the second CSI-RS group can be based on information about the ABS pattern of the at least one additional transmission point received by the primary transmission point.

With respect to the communication module 1210, the communication module can communicate with one or more UEs associated with the primary transmission point to provide independent measurement reports. The independent measurement reports can correspond to the first CSI-RS group and the second CSI-RS group for periodic reporting. Alternatively, the communication module can configure one or more UEs associated with the primary transmission point to provide an independent measurement report. The independent measurement report can correspond to a closest of one of the first CSI-RS group and the second CSI-RS group to a sub-frame on which an aperiodic request is made by the primary transmission point.

In some embodiments, CSI-RSs in the set of CSI-RSs can be configured as CSI-RSs. A CoMP cluster can be a CoMP scenario 3 cluster or a CoMP scenario 4 cluster. The node layer can comprise a high-power MCN eNodeB or a set of LPNs in the CoMP cluster.

Figure 13:
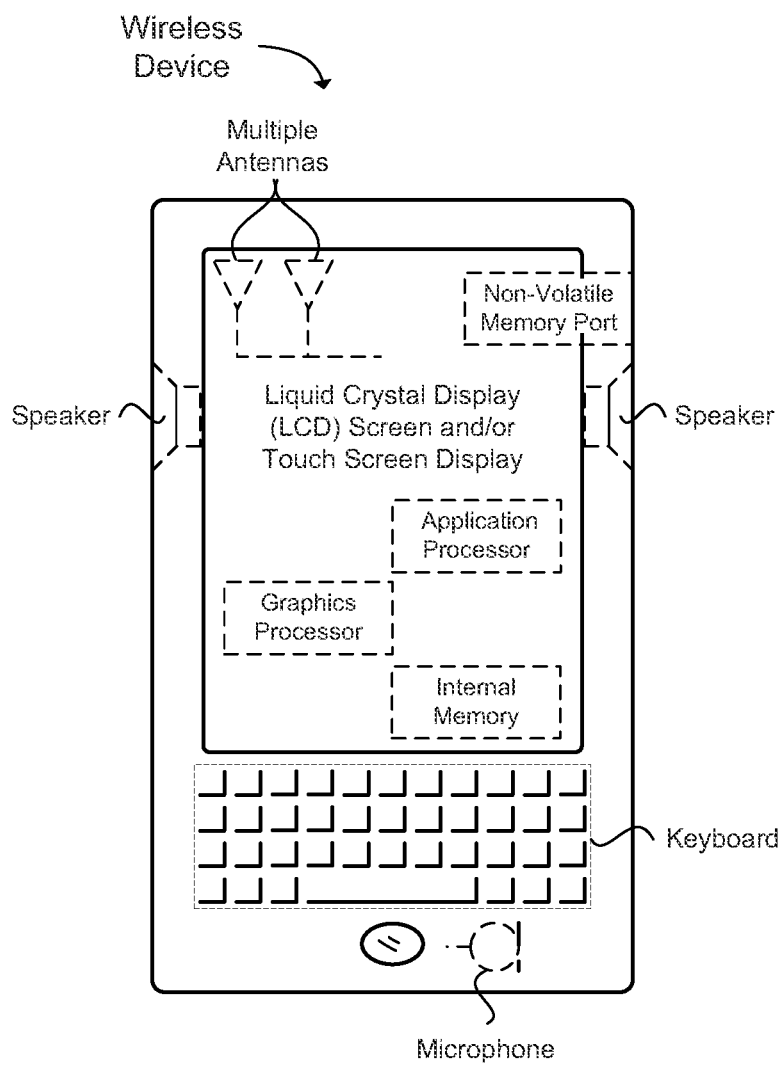

FIG. 13 provides an example illustration of a mobile device, such as a UE, a mobile station (MS), a mobile wireless mobile device, a mobile communication device, a tablet, a handset, or other type of mobile wireless mobile device. The mobile device can include one or more antennas configured to communicate with a BS, an eNodeB, or other type of WWAN transmission point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 13 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the foregoing description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product comprising a non-transitory computer usable medium having a computer readable program code embodied therein, the computer readable program code adapted to be executed to implement instructions for a method for mitigating interference across clusters of wireless transmission points, comprising:

configuring, at a Down Link (DL) transmission point, a Relative Narrowband Transmit Power (RNTP) message indicating a first set of resource blocks at which the DL transmission point is set to transmit with a power that is one of at a power threshold and above a power threshold and a second set of resource blocks at which the DL transmission point is set to transmit with a power less than the power threshold;

identifying an attribute of the DL transmission point corresponding to the RNTP message distinct from a common Cell-IDentification (Cell-ID) of a Coordinated Multi Point (CoMP) cluster to which the DL transmission point pertains, the common Cell-ID also pertaining to at least one other transmission point in the CoMP cluster; and sending the RNTP message via a backhaul link to at least one additional transmission point to enable at least one additional transmission point to schedule a wireless mobile device near a boundary for the DL transmission point on a resource block within a same frequency range as a resource block for which the DL transmission point is set to transmit with a power of less than the power threshold.

2. The computer program product of claim 1, wherein the attribute comprises an indication that the DL transmission point is one of a high-power transmission point and a low-power transmission point within a cluster of transmission points to which the DL transmission point belongs.

3. The computer program product of claim 2, wherein the high-power transmission point is a MaCro-Node (MCN) evolved Node B (eNodeB), and the low-power transmission point is one of a micro cell, a pico cell, a femto cell, a home eNodeB cell (HeNB), a Remote Radio Head (RRH), a Remote Radio Equipment (RRE), and a repeater.

4. The computer program product of claim 1, wherein the attribute comprises an identification unique to the DL transmission point within the CoMP cluster to which the DL transmission point belongs, wherein the identification comprises one of a virtual cell identification and an index value within a transmission point index for transmission points in the CoMP cluster.

5. The computer program product of claim 1, further comprising normalizing a power that is set for a resource block by a maximum transmission power for transmission in the CoMP cluster to which the DL transmission point belongs before determining whether to include the resource block in one of the first set of resource blocks and the second set of resource blocks.

6. The computer program product of claim 1, wherein the power threshold is unique to the attribute of the DL transmission point within the CoMP cluster to which the DL transmission point belongs.

7. The computer program product of claim 1, wherein a backhaul communication of the message takes place over an X2 interface, and the resource block includes 12 sub-carriers within a Physical Resource Block (PRB).

8. A device for reducing interference in a clustering scenario for transmission points for wireless communication, comprising:
- a message module, at a facilitating transmission point, configured to generate a Relative Narrowband Transmit Power (RNTP) message, the RNTP message denoting whether at least one resource block from a set of resource blocks is scheduled for Down Link (DL) transmission at a power level that is one of above a predefined threshold and not above the predefined threshold;
- a distinction module configured to provide information for the RNTP message distinguishing the facilitating transmission point from which the RNTP message originates where the facilitating transmission point has a Cell-IDentification (Cell-ID) common to at least one other transmission point in a Coordinated Multi Point (CoMP) cluster to which the facilitating transmission point pertains; and
- a communication module configured to communicate the RNTP message from the facilitating transmission point to at least one adjacent transmission point over at least one backhaul link.

9. The device of claim 8, wherein the distinction module provides information distinguishing the facilitating transmission point by providing an indication in the RNTP message as to whether the transmission point is one of a high-power transmission point and a low-power transmission point.

10. The device of claim 9, wherein the high-power transmission point and the low-power transmission point belong to the CoMP cluster, wherein the CoMP cluster facilitates an ability to coordinate transmission activities between transmission points in the coordination set of transmission points, and wherein the communication module communicates the RNTP message to at least one transmission point outside of the CoMP cluster.

11. The device of claim 10, wherein a resource block comprises 12 sub-carriers within a Physical Resource Block (PRB), the backhaul link is an X2 interface, the high-power transmission point is a MaCro-Node (MCN) evolved Node B (eNodeB), and the low-power transmission point is one of a micro cell, a pico cell, a femto cell, a home eNodeB cell (HeNB), a Remote Radio Head (RRH), a Remote Radio Equipment (RRE), and a repeater.

12. The device of claim 8, wherein the distinction module provides information distinguishing the facilitating transmission point by providing one of a virtual cell identification and an index value corresponding to a transmit point index, wherein the virtual cell identification and the index value uniquely identify the facilitating transmission point among a coordinated set of transmission points, wherein the coordinated set of transmission points is defined by an ability to coordinate transmission activities between member transmission points in the coordinated set of transmission points.

13. The device of claim 8, further comprising a normalization module configured to normalize a power level of a resource block for the facilitating transmission point in terms of a maximum power for a highest power transmission point in the CoMP cluster, wherein the CoMP cluster provides an ability to coordinate transmission activities between member transmission points in the the CoMP cluster.

14. The device of claim 8, further comprising a threshold module configured to determine one of a first threshold level for the RNTP message from the facilitating transmission point where the facilitating transmission point corresponds to a relatively high-power level and a second threshold for the RNTP message where the facilitating transmission point corresponds to a relatively low-power level.

* * * * *